(12) United States Patent
Shinohara et al.

(10) Patent No.: US 11,363,158 B2
(45) Date of Patent: *Jun. 14, 2022

(54) MULTIFUNCTION APPARATUS EXECUTING PLURALITY OF IMAGE PROCESSES IN PARALLEL, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Taku Shinohara, Saitama (JP); Takaaki Shinkawa, Tokyo (JP); Keita Hidaka, Tsukuba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,665

(22) Filed: Jul. 5, 2019

(65) Prior Publication Data

US 2020/0021706 A1 Jan. 16, 2020

(30) Foreign Application Priority Data

Jul. 11, 2018 (JP) .............................. JP2018-131632

(51) Int. Cl.
*H04N 1/00* (2006.01)
*H04N 1/32* (2006.01)

(52) U.S. Cl.
CPC ....... *H04N 1/00931* (2013.01); *H04N 1/0096* (2013.01); *H04N 1/32598* (2013.01); *H04N 2201/0094* (2013.01)

(58) Field of Classification Search
CPC ........... H04J 3/0635; H03H 2017/0247; G06F 1/04–14; H04N 5/3765
See application file for complete search history.

(56) References Cited

U.S. PATENT DOCUMENTS

| 4,811,052 | A | * | 3/1989 | Yamakawa | G03G 15/50 399/77 |
| 5,327,156 | A | * | 7/1994 | Masukane | H04N 9/641 348/E7.003 |

(Continued)

FOREIGN PATENT DOCUMENTS

| CN | 105812604 A | 7/2016 | |
| EP | 2237163 A1 * | 10/2010 | ......... G06F 13/4291 |

(Continued)

OTHER PUBLICATIONS

Office Action issued in Japanese Appln. No. 2018-131632 dated Mar. 17, 2020.

(Continued)

*Primary Examiner* — Ted W Barnes
(74) *Attorney, Agent, or Firm* — Rossi, Kimms & McDowell LLP

(57) ABSTRACT

A multifunction apparatus that is capable of executing a scan job and another image process in parallel without lowering a reading speed of a scanner unit. A reading unit reads a document according to an execution instruction for a predetermined image process. An image processing unit applies the predetermined image process to image data obtained by the reading unit. A clock controller controls an image transfer clock for transferring the image data to the image processing unit from the reading unit. The clock controller sets a frequency of the image transfer clock to a predetermined frequency in a case where the predetermined image process is executed independently. And the clock controller sets the frequency of the image transfer clock to a frequency lower than the predetermined frequency in a case where the predetermined image process is executed in parallel with another image process that differs from the predetermined image process.

10 Claims, 21 Drawing Sheets

(56) References Cited

U.S. PATENT DOCUMENTS

| | | | | |
|---|---|---|---|---|
| 5,630,032 | A * | 5/1997 | Yamaguchi | G06F 3/12 |
| | | | | 358/1.16 |
| 5,631,701 | A * | 5/1997 | Miyake | H04N 1/2112 |
| | | | | 348/222.1 |
| 5,915,111 | A | 6/1999 | Ouchi | |
| 8,120,807 | B2 * | 2/2012 | Honma | H04N 1/00204 |
| | | | | 358/1.18 |
| 9,530,085 | B2 * | 12/2016 | Yamamoto | H04N 1/0057 |
| 9,571,694 | B2 * | 2/2017 | Hirao | H04N 1/0443 |
| 10,277,770 | B2 * | 4/2019 | Hirao | H04N 1/32598 |
| 10,841,445 | B2 * | 11/2020 | Kasuya | H04N 1/00411 |
| 11,115,552 | B2 * | 9/2021 | Sato | H04N 1/00572 |
| 11,134,165 | B2 * | 9/2021 | Sato | H04N 1/0446 |
| 11,165,924 | B2 * | 11/2021 | Maruyama | H04N 1/047 |
| 2001/0022671 | A1 * | 9/2001 | Itoh | H04N 1/36 |
| | | | | 358/448 |
| 2002/0071104 | A1 | 6/2002 | Silverbrook | |
| 2003/0033368 | A1 | 2/2003 | Tominaga | |
| 2003/0156212 | A1 * | 8/2003 | Kingetsu | H04N 5/23293 |
| | | | | 348/333.12 |
| 2004/0213482 | A1 | 10/2004 | Silverbrook | |
| 2005/0099660 | A1 * | 5/2005 | Yada | H04N 1/00416 |
| | | | | 358/498 |
| 2005/0206973 | A1 * | 9/2005 | Shoji | H04N 1/33315 |
| | | | | 358/448 |
| 2005/0264691 | A1 * | 12/2005 | Endo | H04N 7/012 |
| | | | | 348/446 |
| 2007/0070410 | A1 * | 3/2007 | Suzuki | H04N 1/00204 |
| | | | | 358/1.15 |
| 2008/0100888 | A1 * | 5/2008 | Nagasaka | H04N 1/00689 |
| | | | | 358/514 |
| 2008/0204768 | A1 * | 8/2008 | Ikuno | H04N 1/00941 |
| | | | | 358/1.1 |
| 2008/0239380 | A1 * | 10/2008 | Takahashi | G03G 15/5004 |
| | | | | 358/1.15 |
| 2009/0245827 | A1 * | 10/2009 | Matsumoto | G03G 15/5029 |
| | | | | 399/45 |
| 2010/0271667 | A1 * | 10/2010 | Nakata | H04N 1/00798 |
| | | | | 358/406 |
| 2011/0216375 | A1 * | 9/2011 | Suzuki | H04N 1/00 |
| | | | | 358/401 |
| 2011/0261384 | A1 * | 10/2011 | Tachikawa | H04N 1/32561 |
| | | | | 358/1.13 |
| 2011/0310413 | A1 * | 12/2011 | Nakao | H04N 1/00233 |
| | | | | 358/1.9 |
| 2012/0212788 | A1 * | 8/2012 | Miyazaki | H04N 1/0443 |
| | | | | 358/474 |
| 2012/0287444 | A1 * | 11/2012 | Osada | H04N 1/00068 |
| | | | | 358/1.2 |
| 2012/0307320 | A1 * | 12/2012 | Takeda | H04N 1/1135 |
| | | | | 358/474 |
| 2013/0007078 | A1 * | 1/2013 | Wegener | H03M 7/30 |
| | | | | 708/203 |
| 2013/0050742 | A1 * | 2/2013 | Ward | G06K 15/1886 |
| | | | | 358/1.15 |
| 2013/0198507 | A1 * | 8/2013 | Kasuya | G06F 8/65 |
| | | | | 713/100 |
| 2015/0055160 | A1 * | 2/2015 | Ito | H04N 1/00933 |
| | | | | 358/1.13 |
| 2015/0358503 | A1 * | 12/2015 | Hirao | H04N 1/3935 |
| | | | | 358/474 |
| 2016/0173728 | A1 * | 6/2016 | Kasuya | H04N 1/00281 |
| | | | | 358/1.14 |
| 2016/0210543 | A1 * | 7/2016 | Yamamoto | H04N 1/00795 |
| 2017/0060493 | A1 * | 3/2017 | Furukawa | G03G 15/234 |
| 2017/0111539 | A1 * | 4/2017 | Hirao | H04N 1/3935 |
| 2017/0223222 | A1 * | 8/2017 | Yasunaga | H04N 1/00923 |
| 2018/0063356 | A1 * | 3/2018 | Hirao | H04N 1/32598 |
| 2019/0196763 | A1 * | 6/2019 | Kubo | G06F 3/1222 |
| 2020/0021703 | A1 * | 1/2020 | Kasuya | H04N 1/00482 |
| 2020/0151334 | A1 * | 5/2020 | Aoyagi | H04N 1/00938 |
| 2021/0067652 | A1 * | 3/2021 | Sato | H04N 1/00822 |
| 2021/0084190 | A1 * | 3/2021 | Sato | H04N 1/00822 |
| 2021/0120133 | A1 * | 4/2021 | Shinohara | H04N 1/00236 |
| 2021/0195047 | A1 * | 6/2021 | Maruyama | H04N 1/047 |
| 2021/0281687 | A1 * | 9/2021 | Maruyama | H04N 1/00912 |

FOREIGN PATENT DOCUMENTS

| | | | | |
|---|---|---|---|---|
| EP | 2237163 | A1 | 10/2010 | |
| EP | 3594819 | A1 * | 1/2020 | B41J 29/393 |
| JP | 05336385 | A * | 12/1993 | |
| JP | H05336385 | A | 12/1993 | |
| JP | 2003345567 | A * | 12/2003 | |
| JP | 2003345567 | A | 12/2003 | |
| JP | 2009124316 | A | 6/2009 | |
| JP | 2013153521 | A | 8/2013 | |
| JP | 2013153521 | A * | 8/2013 | H04N 1/0402 |
| JP | 2014130425 | A | 7/2014 | |
| JP | 2015231219 | A | 12/2015 | |
| JP | 2016133855 | A | 7/2016 | |
| JP | 6072090 | B2 * | 2/2017 | G06F 1/04 |
| JP | 2018033087 | A | 3/2018 | |
| RU | 2408155 | C1 | 12/2010 | |

OTHER PUBLICATIONS

Copending U.S. Appl. No. 16/503,669, filed Jul. 5, 2019.
Extended European Search Report issued in EP Appln. No. 19184620.3 dated Nov. 21, 2019.
Combined Search and Examination Report issued in GB Appln. No. 1909683.3 dated Nov. 25, 2019.
Office Action issued in U.S. Appl. No. 16/503,669 dated Jan. 22, 2020.
Notice of Allowance issued in Russian Appln. No. 2019120995 dated Jun. 29, 2020. English translation provided.
Notice of Allowance issued in U.S. Appl. No. 16/503,669 dated Jun. 24, 2020.
Examination Report issued in Singapore Appln. No. 10201906268R dated Dec. 9, 2020.
Examination Report issued in Indian Appln. No. 201944026991 dated Jun. 1, 2021. English translation provided.
Office Action issued in Chinese Appln. No. 201910603983.0 dated Aug. 24, 2021. English translation provided.
Notice of Allowance issued in Chinese Appln. No. 201910603983.0 dated Feb. 18, 2022. English translation provided.

* cited by examiner

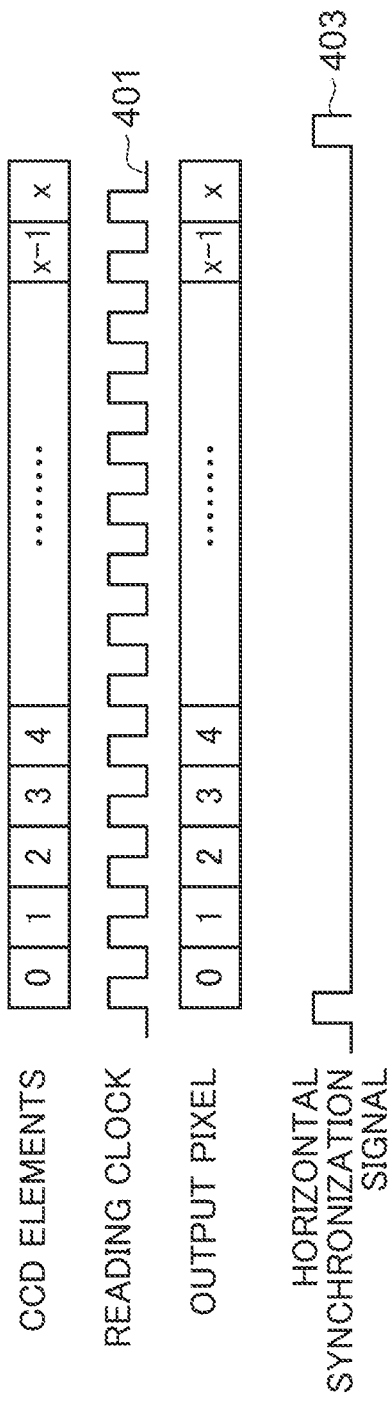
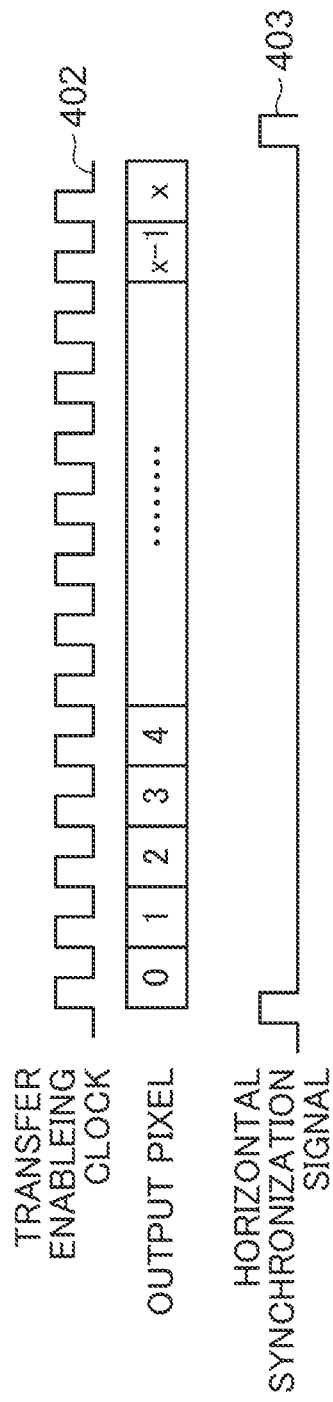

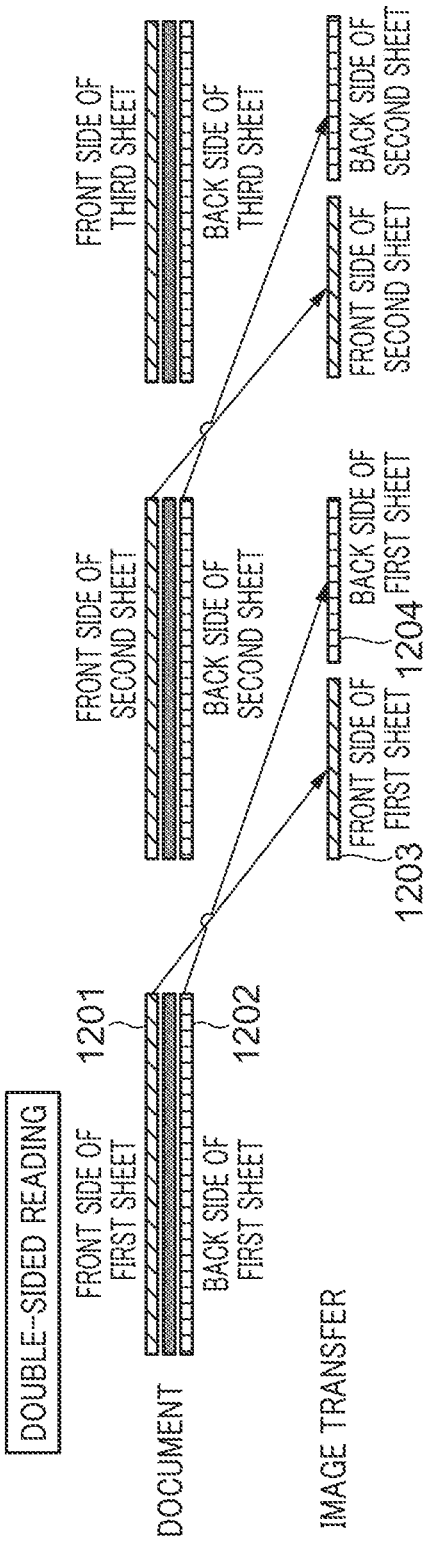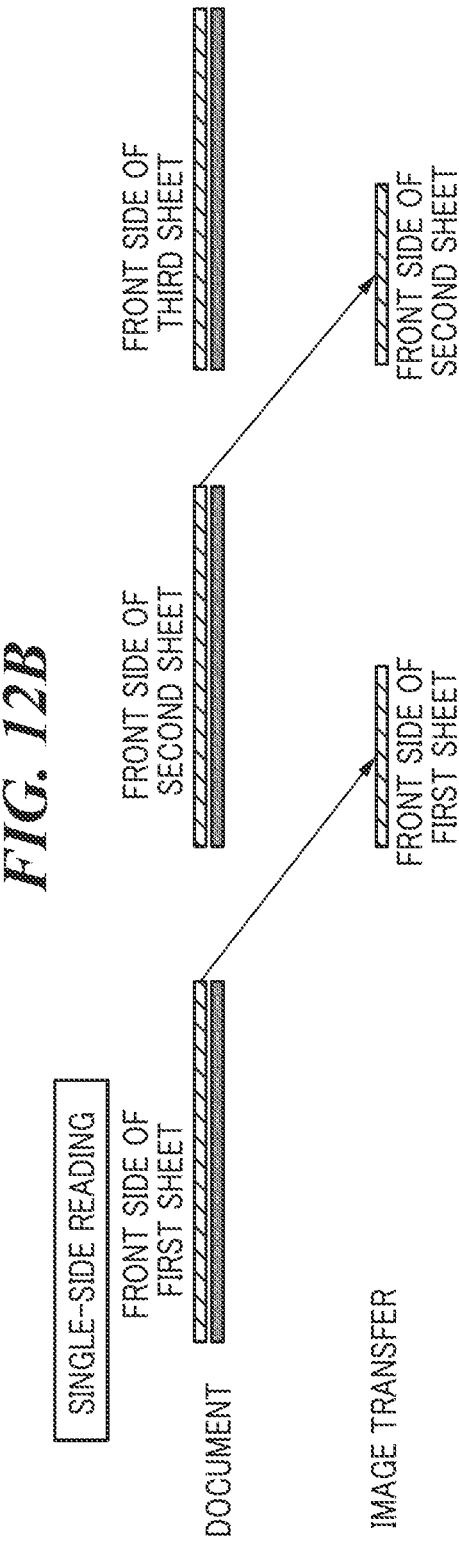

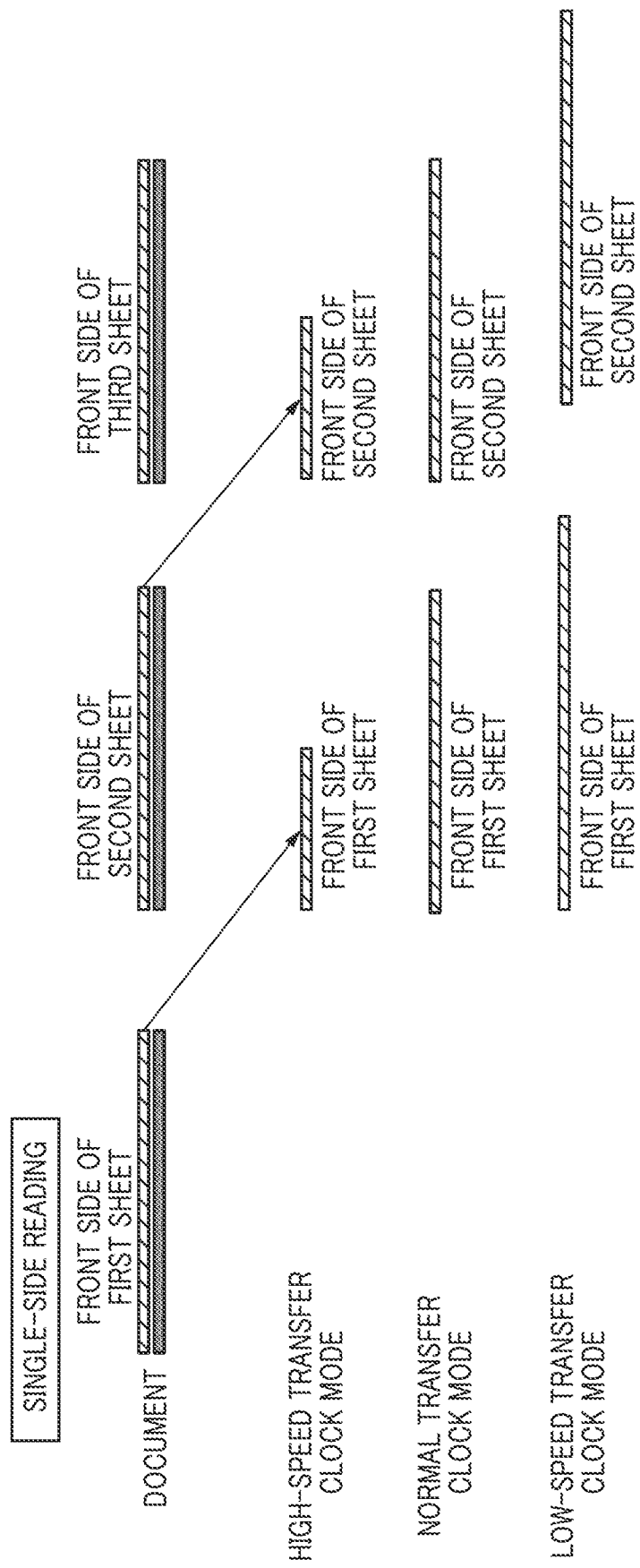

FIG. 15A

HIGH-SPEED TRANSFER CLOCK MODE

| | | | | | |
|---|---|---|---|---|---|
| Scan | ○ | ○ | ○ | ○ | ○ |
| Print | | ○ | | | |
| Rip | | | ○ | | |
| Send | | | | ○ | |
| Fax | | | | | ○ |

FIG. 15B

NORMAL TRANSFER CLOCK MODE

| | | | | | | | |
|---|---|---|---|---|---|---|---|
| Scan | ○ | ○ | ○ | ○ | ○ | ○ | ○ |
| Print | ○ | ○ | ○ | ○ | | | |
| Rip | ○ | | | | ○ | ○ | |
| Send | | ○ | ○ | | ○ | | ○ |
| Fax | | | | ○ | | ○ | ○ |

FIG. 15C

LOW-SPEED TRANSFER CLOCK MODE

| | | | | | |
|---|---|---|---|---|---|
| Scan | ○ | ○ | ○ | ○ | ○ |
| Print | ○ | ○ | ○ | | ○ |
| Rip | ○ | ○ | | ○ | ○ |
| Send | ○ | | ○ | ○ | ○ |
| Fax | | ○ | ○ | ○ | ○ |

FIG. 21A

| 2101 | RGB | GRAY |
|---|---|---|
| Scan | | |
| 600 × 600dpi | 12 | 4 |
| 600 × 300dpi | 6 | 2 |
| 300 × 300dpi | 3 | 1 |

FIG. 21B

| | |
|---|---|
| SCANNER (HIGH SPEED) | 1 |
| SCANNER (NORMAL SPEED) | 0.8 |

| | |
|---|---|
| Print | 8 |
| Rip | 6 |
| Send | 4 |
| Fax | 3 |

| | | |
|---|---|---|
| Scan | ○ | ○ |
| Print | ○ | |
| Rip | | |
| Send | ○ | |
| Fax | ○ | ○ |

FIG. 21E

| | | | | | | | | | | | |
|---|---|---|---|---|---|---|---|---|---|---|---|
| Scan  | ○ | ○ | ○ | ○ | ○ | ○ | ○ | ○ | ○ | ○ | ○ |
| Print | ○ | ○ |   | ○ | ○ | ○ | ○ |   |   |   |   |
| Rip   |   |   | ○ | ○ | ○ |   |   |   | ○ | ○ |   |
| Send  |   |   |   |   |   | ○ | ○ | ○ |   | ○ | ○ |
| Fax   |   |   |   |   | ○ |   | ○ |   |   | ○ | ○ |

MULTIFUNCTION APPARATUS EXECUTING PLURALITY OF IMAGE PROCESSES IN PARALLEL, CONTROL METHOD THEREFOR, AND STORAGE MEDIUM STORING CONTROL PROGRAM THEREFOR

BACKGROUND OF THE INVENTION

Field of the Invention

The present invention relates to a multifunction apparatus that executes a plurality of image processes in parallel, a control method therefor, and a storage medium storing a control program therefor.

Description of the Related Art

An MFP as a multifunction apparatus that is provided with a plurality of functions, such as a scan function and a print function, is known. In an MFP, a scanner unit reads a document at a reading speed set by a user and transfers image data of the document read to an image processor by an image transfer clock at a predetermined frequency. The image processor applies an image process to the image data received, stores processed image data into a main memory of the MFP temporarily, and obtains the processed image data from the main memory when another image process is applied to the processed image data. In the MFP, the scanner unit, image processor, and main memory transfer data through one image bus. In recent years, an MFP that enables high-speed reading is developed. When such an MFP performs a high-speed reading scan job, a data transfer amount per unit time through an image bus increases as compared with a case where a normal-speed reading scan job is executed. Moreover, since an image process about PDL data for a printer unit to print is also executed by the image processor in an MFP, the printer unit and image processor transfer data through the above-mentioned image bus.

An MFP may be instructed to execute another job like a print job while executing a scan job and may execute the print job in parallel with the scan job. In this case, since the scanner unit, printer unit, image processor, and main memory transfer data in parallel through the image bus in the MFP, the image bus is crowded. Furthermore, when the high-speed reading is performed in the scan job, the data transfer amount through the image bus per unit time becomes huge and may exceed a transferable upper limit value of the image bus. When the data transfer amount through the image bus exceeds the transferable upper limit value, data cannot be transferred through the image bus and executions of the scan job and print job stop. In order to cope with such a problem, there is a known MFP that lowers a reading speed of a scan job to control a data transfer amount through an image bus per unit time (for example, see Japanese Laid-Open Patent Publication (Kokai) No. 2013-153521 (JP 2013-153521A)).

However, when the reading speed of the scanner unit is lowered in order to execute a print job in parallel like the above-mentioned MFP, waiting time of a user up to completion of reading in a scan job becomes longer.

SUMMARY OF THE INVENTION

The present invention provides a multifunction apparatus that is capable of executing a scan job and another image process in parallel without lowering a reading speed of a scanner unit, a control method therefor, and a storage medium storing a control program therefor.

Accordingly, a first aspect of the present invention provides a multifunction apparatus including a reading unit configured to read a document according to an execution instruction for a predetermined image process, an image processing unit configured to apply the predetermined image process to image data obtained by the reading unit, and a clock controller configured to control an image transfer clock for transferring the image data of the document to the image processing unit from the reading unit. The clock controller sets a frequency of the image transfer clock to a predetermined frequency in a case where the predetermined image process is executed independently. And the clock controller sets the frequency of the image transfer clock to a frequency lower than the predetermined frequency in a case where the predetermined image process is executed in parallel with at least one other image process that differs from the predetermined image process.

Accordingly, a second aspect of the present invention provides a control method for a multifunction apparatus that includes a reading unit that reads a document according to an execution instruction for a predetermined image process and an image processing unit that applies the predetermined image process to image data obtained by the reading unit, the control method including a first setting step of setting a frequency of an image transfer clock for transferring the image data of the document to the image processing unit from the reading unit to a predetermined frequency in a case where the predetermined image process is executed independently, and a second setting step of setting the frequency of the image transfer clock to a frequency lower than the predetermined frequency in a case where the predetermined image process is executed in parallel with at least one other image process that differs from the predetermined image process.

Accordingly, a third aspect of the present invention provides a non-transitory computer-readable storage medium storing a control program causing a computer to execute the control method of the second aspect.

According to the present invention, a scan job and another image process are executed in parallel without lowering the reading speed of the scanner unit.

Further features of the present invention will become apparent from the following description of exemplary embodiments with reference to the attached drawings.

BRIEF DESCRIPTION OF THE DRAWINGS

FIG. 4A and FIG. 4B are views for describing clocks for controlling reading of an image with a CIS (Contact Image Sensor) in FIG. 2.

FIG. 12A and FIG. 12B are views for describing simultaneous double side reading by the scanner unit in FIG. 1.

FIG. 13 is a view for describing a transfer mode of the scanner unit in FIG. 1.

FIG. 15A, FIG. 15B, and FIG. 15C are views showing examples of combinations of image processes that are executable in parallel in respective transfer modes.

FIG. 21A through FIG. 21E are views for describing calculation of a band use amount of the image path in FIG. 1.

DESCRIPTION OF THE EMBODIMENTS

Figure 1:
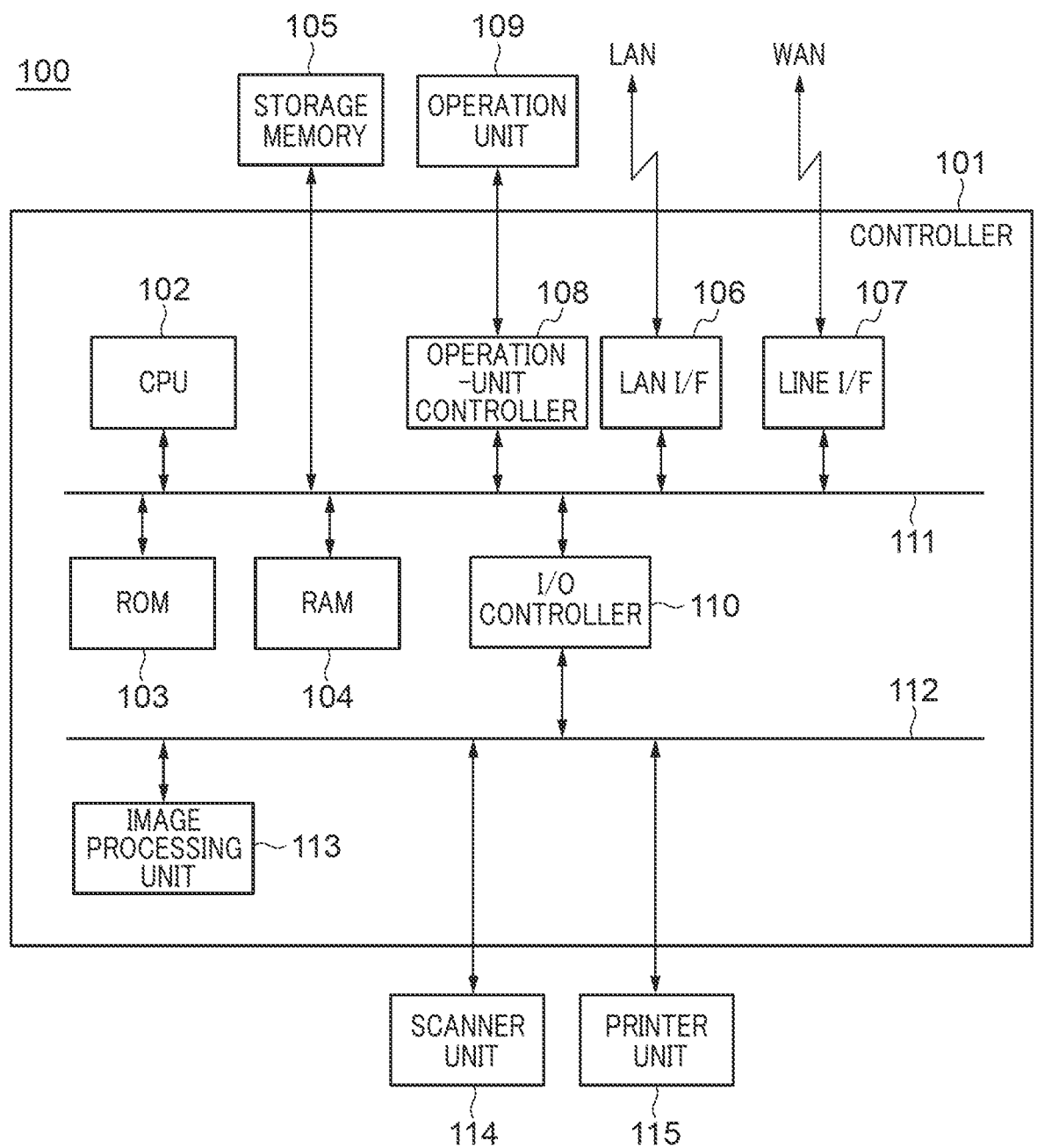
FIG. 1 is a block diagram schematically showing a configuration of an MFP as a multifunction apparatus according to a first embodiment of the present invention.

Hereafter, embodiments according to the present invention will be described in detail by referring to the drawings. First, a multifunction apparatus according to a first embodiment of the present invention is described.

FIG. 1 is a block diagram schematically showing a configuration of an MFP 100 as the multifunction apparatus according to the first embodiment of the present invention.

As shown in FIG. 1, the MFP 100 is provided with a controller 101, a storage memory 105, an operation unit 109, a scanner unit 114, and a printer unit 115. The controller 101 is connected with the storage memory 105, operation unit 109, scanner unit 114, and printer unit 115. Moreover, the controller 101 is provided with a CPU 102, a ROM 103, a RAM 104, a LAN I/F 106, a line I/F 107, an operation-unit controller 108, an IO controller 110, and an image processor 113. The CPU 102, ROM 103, RAM 104, LAN I/F 106, line I/F 107, operation-unit controller 108, and IO controller 110 are mutually connected through a system bus 111. The image processor 113 is connected with the IO controller 110 through an image bus 112.

The controller 101 totally controls the entire MFP 100. The CPU 102 runs programs stored in the ROM 103 or the storage memory 105 to make software modules (not shown) of the MFP 100 execute various processes. A boot program for the system is stored in the ROM 103. The RAM 104 is a system work memory area for the CPU 102 to execute the software modules (not shown) of the MFP 100. Moreover, the RAM 104 is an image memory for storing image data temporarily when the image data is processed. The storage memory 105 consists of an HDD (a Hard Disk Drive) and an SSD (a Solid State Drive), and is used as internal storage. A system software module for achieving respective functions of the MFP 100 and the image data transferred from the RAM 104 are stored in the storage memory 105, for example.

The LAN I/F 106 connects the MFP 100 to a LAN. The LAN I/F 106 performs data communication with an external apparatus connected to the LAN. The line I/F 107 connects the MFP 100 to a WAN. The line I/F 107 performs data communication with an external apparatus connected to the WAN. The operation-unit controller 108 is an I/F between the controller 101 and operation unit 109. For example, the operation-unit controller 108 outputs a VGA signal to the operation unit 109 so as to display an image corresponding to the VGA signal on the operation unit 109. Moreover, the operation-unit controller 108 outputs the information that a user inputs through the operation unit 109 to the CPU 102. The operation unit 109 consists of an LCD touch panel etc. The operation unit 109 interprets a VGA signal output from the operation-unit controller 108 so as to display an image corresponding to the VGA signal.

The IO controller 110 is a bus bridge that connects the system bus 111 and the image bus 112, and converts data structure of the system bus 111. The image bus 112 consists of general-purpose buses, such as a PCI bus, IEEE 1394, and PCIEx, and transfers image data at a high speed. The scanner unit 114 and the printer unit 115 are connected to the image bus 112 other than the IO controller 110 and the image processor 113. The image bus 112 converts image data between a synchronizing system and an asynchronous system. The image processor 113 consists of a plurality of ASICs as shown in the FIG. 7 mentioned later. The image processor 113 applies image processes, such as a resolution conversion process, a compression process, an expansion process, and a binary multiple value conversion process, to image data. The scanner unit 114 is provided with a DF (Document Feeder) unit 200 in FIG. 2 and a scanner controller 300 in FIG. 3. The scanner unit 114 reads a document and generates image data. The printer unit 115 prints the image data which the scanner unit 114 generated.

Figure 2:
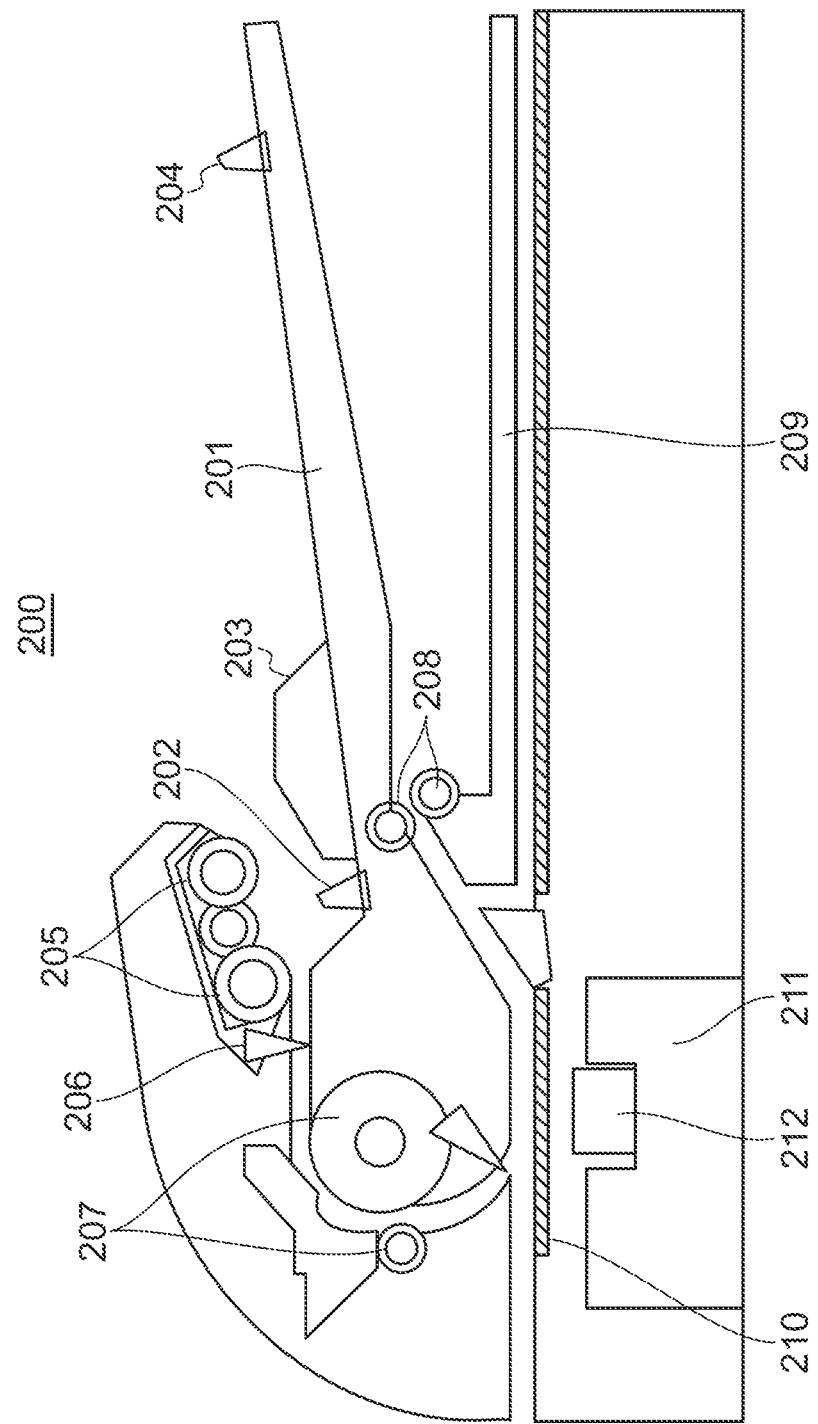
FIG. 2 is a side view showing internal structure of a DF (Document Feeder) unit in a scanner unit in FIG. 1.

FIG. 2 is a side view showing internal structure of the DF unit 200 of the scanner unit 114 in FIG. 1. It should be noted that FIG. 2 shows the internal structure in a penetrated state in order to facilitate understanding.

A document tray 201 for stacking documents is provided in the DF unit 200. A document sensor 202, a pair of document guides 203, and a document-size sensor 204 are provided in the document tray 201. The document sensor 202 detects whether a document is stacked on the document tray 201. The pair of document guides 203 are arranged so as to face each other in a direction that intersects perpendicularly with a conveyance direction of a document. A document stacked on the document tray 201 is conveyed with three roller pairs, which are a pickup roller pair 205, a conveying roller pair 207, and a discharge roller pair 208. The pickup roller pair 205 conveys a document stacked on the document tray 201 to a document conveyance path (not shown) of the DF unit 200. The document conveyed by the pickup roller pair 205 is detected by a document passage sensor 206. In the DF unit 200, it is determined whether the document of the first sheet passed on the basis of the period that the document passage sensor 206 detected. The conveying roller pair 207 conveys the document conveyed by the pickup roller pair 205 along the document conveyance path to the discharge roller pair 208. The discharge roller pair 208 conveys the document conveyed by the conveying roller pair 207 to the document discharge tray 209. It should be noted that the pickup roller pair 205, the conveying roller pair 207, and the discharge roller pair 208 are driven by a stepping motor (not shown).

The document conveyed along the above-mentioned document conveyance path is read by a sensor unit 211 while passing through a transparent DF reading window 210 provided in the document conveyance path concerned. The sensor unit 211 is provided with a CIS (Contact Image Sensor) 212 and is arranged at a position where the document conveyed along the above-mentioned document conveyance path can be read through the DF reading window 210. The sensor unit 211 is freely movable in a sub-scanning direction. For example, the sensor unit 211 moves in the same direction as the conveyance direction of the document conveyed from the conveying roller pair 207 to the discharge roller pair 208. It should be noted that the DF reading window 210 has a length of a certain degree in the sub-scanning direction. The CIS 212 is movable to an arbitrary position within the range of the length and is able to read a document at the moved position. The CIS 212 consists of a plurality of photoelectric conversion elements that are CCD elements, for example. The CCD elements are arranged along a line in the CIS 212. The CIS 212 generates a control signal for controlling FIFO for accumulating pixel data read by each CCD element.

Figure 3:
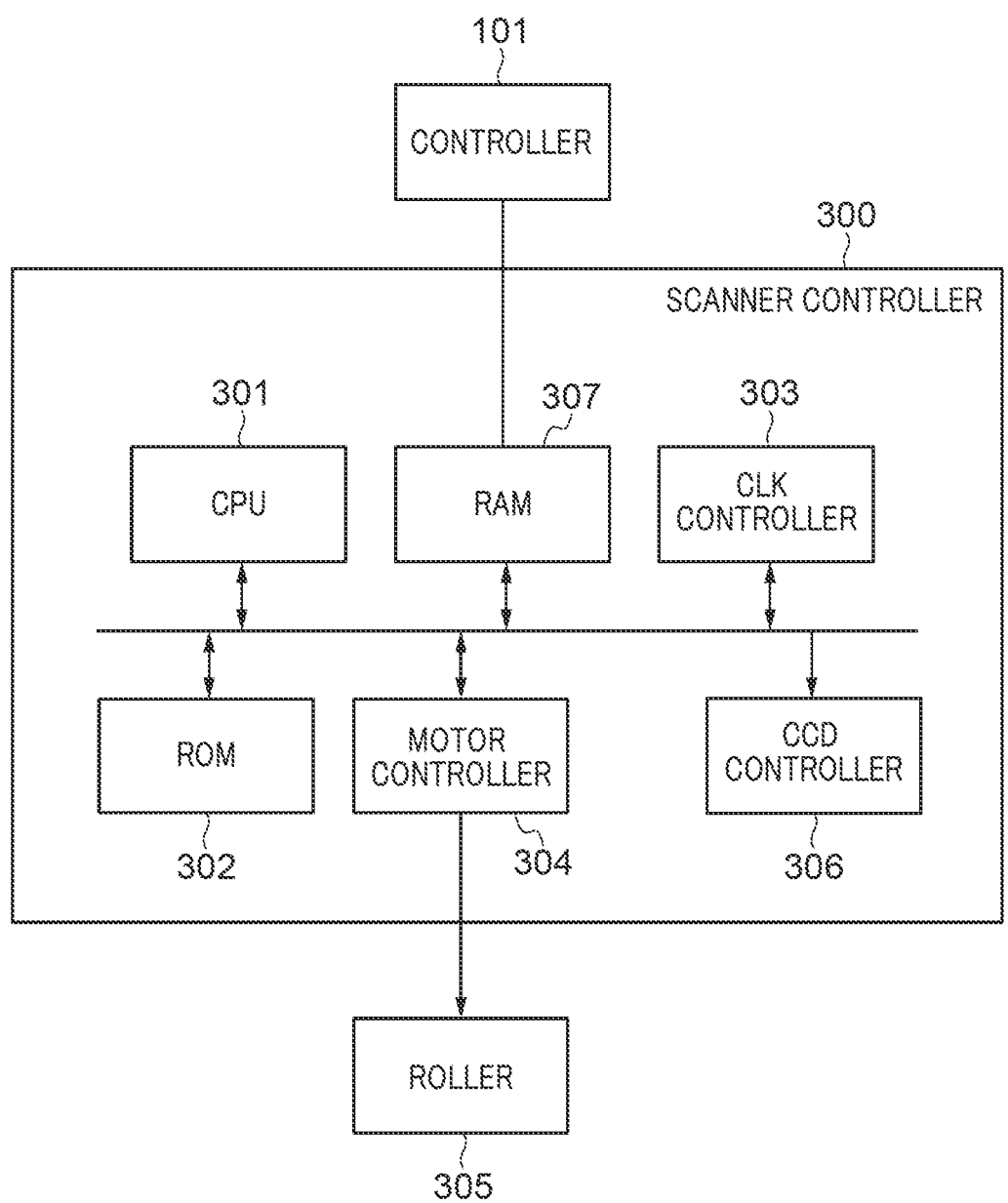
FIG. 3 is a block diagram schematically showing a configuration of a scanner controller in the scanner unit in FIG. 1.

FIG. 3 is a block diagram schematically showing a configuration of a scanner controller 300 in the scanner unit 114 in FIG. 1.

As shown in FIG. 3, the scanner controller 300 is provided with a CPU 301, ROM 302, CLK controller (clock controller) 303, motor controller 304, CCD controller 306, and RAM 307.

The scanner controller 300 controls an action of the scanner unit 114 by making the CPU 301 run a scanner control application program (not shown) stored in the ROM 302. The scanner control application program aims to boot a scanner control application (not shown) that controls the scanner controller 300. Although the first embodiment describes a case where the CPU 301 runs the scanner control application program, the device that runs the scanner control application program is not limited to the CPU 301. For example, the CPU 102 of the controller 101 may control an action of the scanner unit 114 by running the scanner control application program.

The CLK controller 303 supplies clocks to the respective devices that constitute the scanner controller 300. The clocks include an image transfer clock mentioned later. The CLK controller 303 consists of a crystal oscillator (not shown) that generates a clock and a PLL (not shown). The PLL multiplies or divides the clock that the crystal oscillator generates. When an execution instruction for scanning is received from a user, the CLK controller 303 outputs clocks to the motor controller 304, CCD controller 306, and RAM 307 in the scanner unit 114. For example, the motor controller 304 generates a control clock for a motor (not shown) that rotates a roller 305 on the basis of the clock received from the CLK controller 303. The execution instruction for scanning includes information about a distinction between color and monochrome, resolution, etc. The scanner control application changes a setting of the PLL of the CLK controller 303 in accordance with contents of the instruction. The CLK controller 303 controls the frequency of the clock to output in accordance with the setting of the PLL. Thereby, the reading speed of the scanner unit 114 is changed. The RAM 307 accumulates the image data of the document that the CIS 212 read. The RAM 307 has capacity that allows to store only image data of four A4-size sheets.

The scanner controller 300 controls reading of an image with the CIS 212 in accordance with a reading clock 401 in FIG. 4A and a transfer enabling clock 402 in FIG. 4B. The reading clock 401 is a clock signal for reading pixel data that constitutes image data from each CCD element. The transfer enabling clock 402 is an image transfer clock. The image transfer clock is a clock signal for controlling whether the read pixel data is transferred to the controller 101. The scanner controller 300 reads pixel data from each CCD element at a time of rising of the reading clock 401. The pixel data read from each CCD element is accumulated in the RAM 307. Moreover, the scanner controller 300 transfers the pixel data accumulated in the RAM 307 to the controller 101 in synchronization with a rising of the transfer enabling clock 402 controlled on the basis of a horizontal synchronization signal 403 in FIG. 4A. The horizontal synchronization signal 403 is a clock signal that controls start of reading of one line of the CCD.

Moreover, the scanner controller 300 generates a PWM signal that drives the pickup roller pair 205 provided in the scanner unit 114 in synchronization with the horizontal synchronization signal 403. In the MFP 100, when a document is read at a high speed, the cycle of the horizontal synchronization signal 403 is shortened. Thereby, the rotational speed of the pickup roller pair 205 increases relatively, which increases a document conveyance speed and increases a document reading speed. Moreover, the scanner controller 300 raises the frequency of the reading clock 401 in accordance with the document reading speed in order to read a signal from the CCD element in a short time. The scanner controller 300 accumulates the pixel data to the RAM 307 in accordance with the cycle of the reading clock 401. Moreover, the scanner controller 300 raises the frequency of the transfer enabling clock 402 in response to the control of the frequency of the reading clock 401, and transfers pixel data to the controller 101 from the RAM 307 in a short time.

Figure 5:
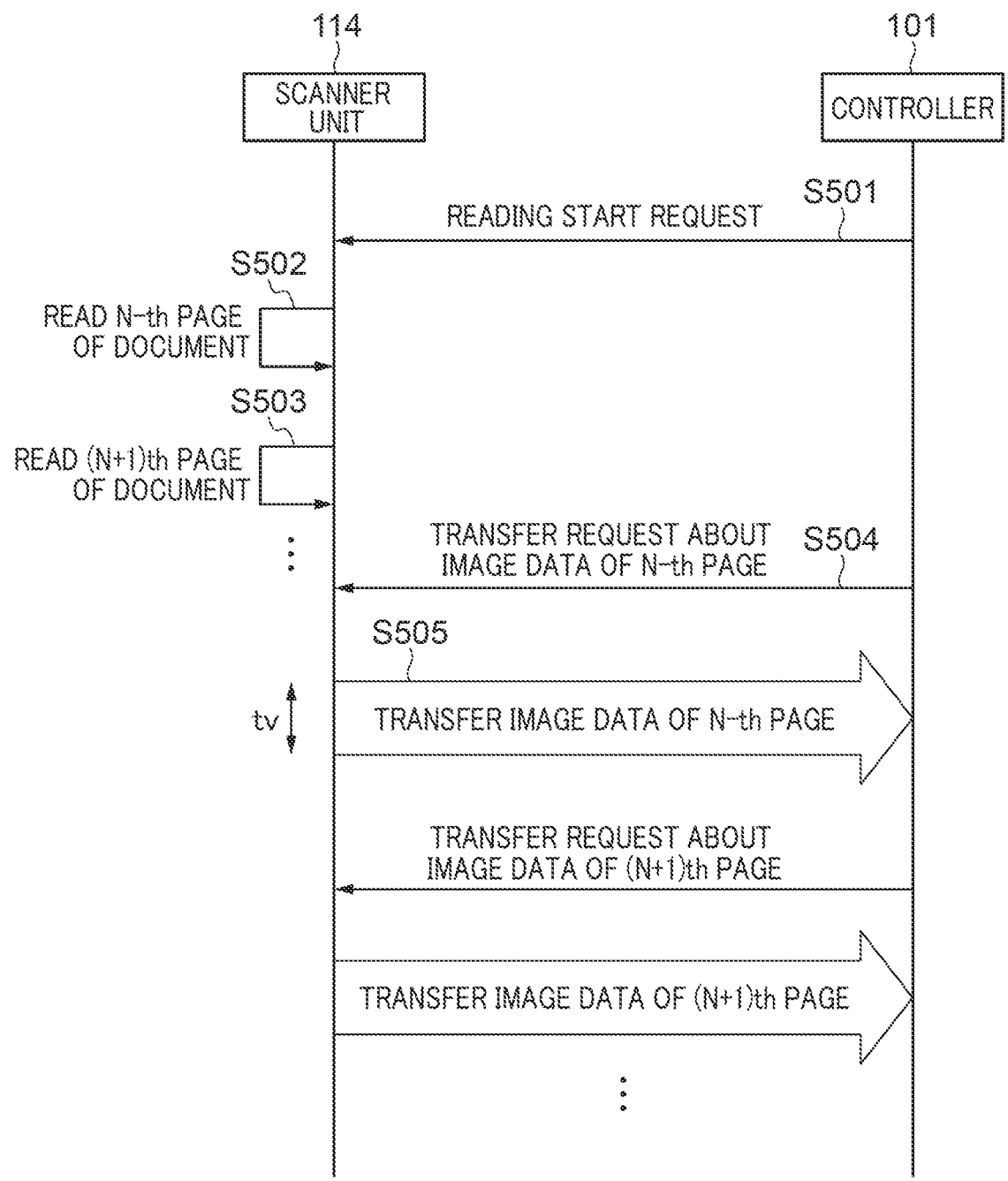
FIG. 5 is a sequence chart about an image reading operation executed by the MFP in FIG. 1.

FIG. 5 is a sequence chart about an image reading operation executed by the MFP 100 in FIG. 1. The reading operation in FIG. 5 is executed by the above-mentioned scanner control application that controls the scanner unit 114 and a job control application (not shown) that controls the controller 101.

As shown in FIG. 5, when receiving a reading start request from the controller 101 (step S501), the scanner unit 114 reads an N-th page of a document in accordance with the reading clock 401 (step S502). The image data of the N-th page that consists of a plurality of pixel data read by the CCD elements is stored in the RAM 307. When completing the reading of the N-th page of the document, the scanner unit 114 reads the next page ((N+1)th page) of the document (step S503).

Figure 6:
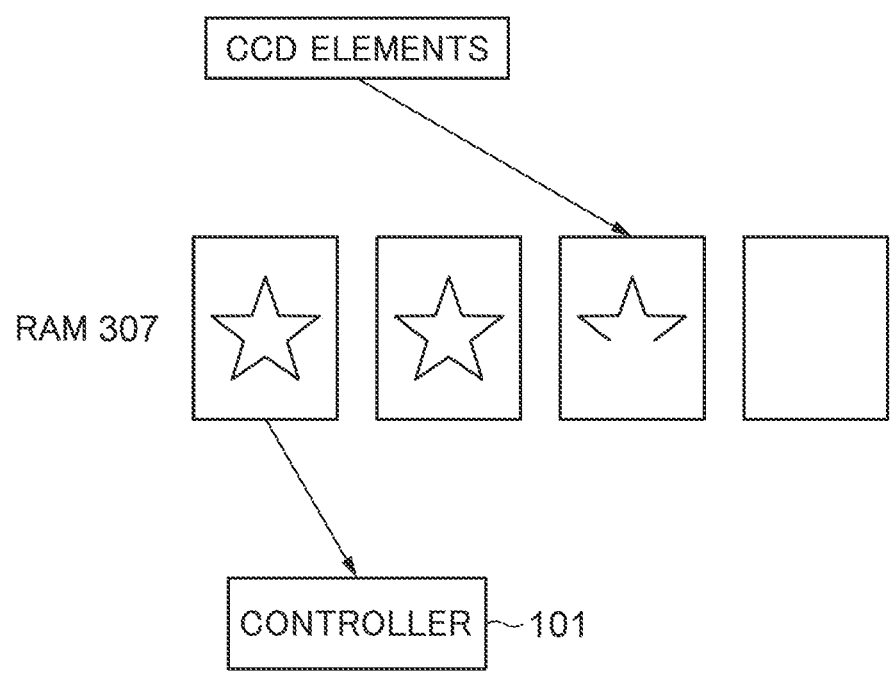
FIG. 6 is a view for describing transfer of image data from a RAM to a controller in FIG. 3.

In the meantime, when receiving a transfer request about the image data of the N-th page from the controller 101 (step S504), the scanner unit 114 transfers the image data of the N-th page to the controller 101 in response to the transfer enabling clock 402 (step S505). The image data that has been transferred to the controller 101 is removed from the RAM 307. Since the RAM 307 cannot store image data that exceeds four pages, the MFP 100 is controlled so that image data stored in the RAM 307 will be transferred to the controller 101 before using up the storage area of the RAM 307 as shown in FIG. 6.

Figure 7:
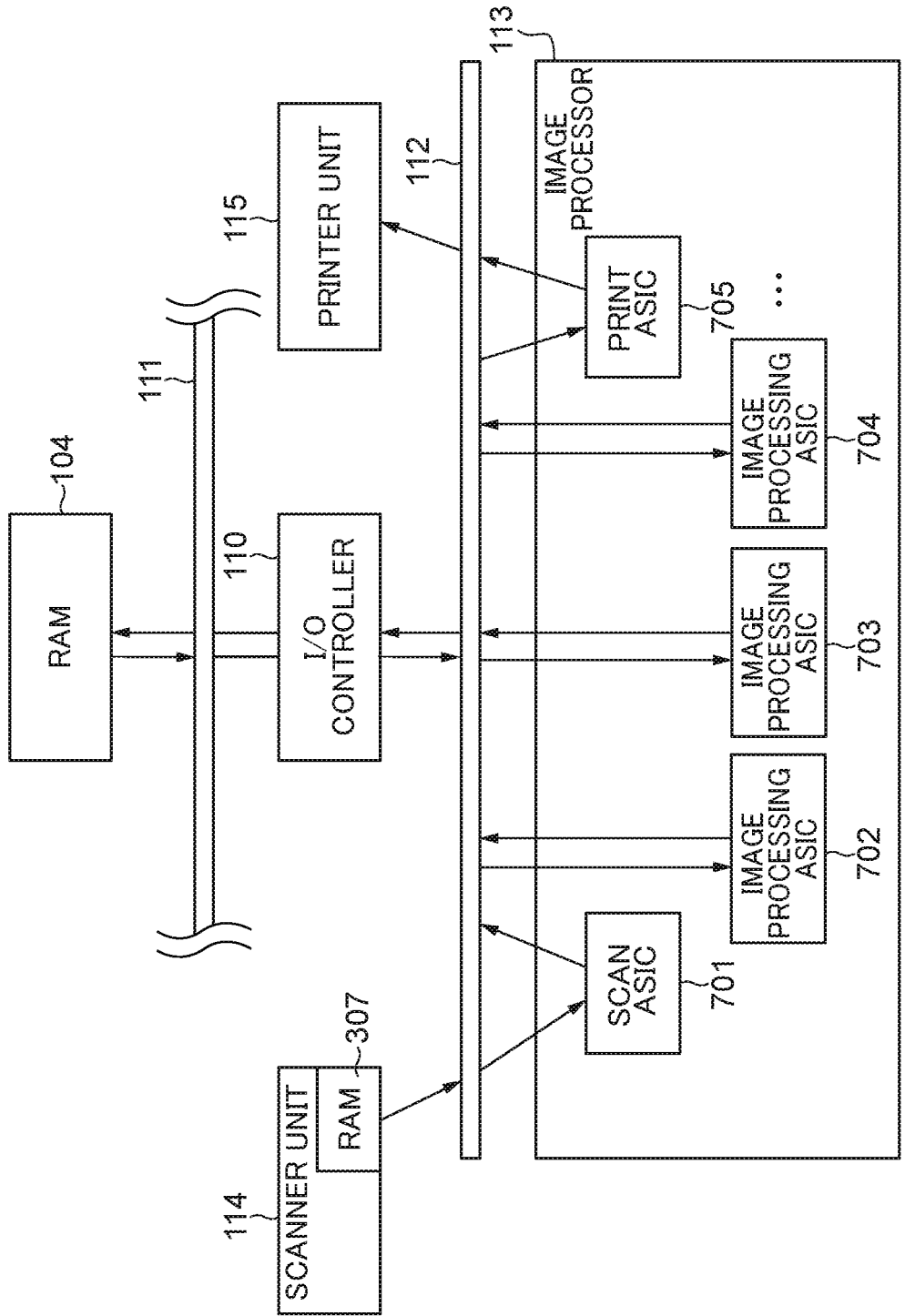
FIG. 7 is a block diagram for describing a configuration of an image processor in FIG. 1.

FIG. 7 is a block diagram for describing a configuration of the image processor 113 in FIG. 1. As shown in FIG. 7, the image processor 113 is provided with a plurality of ASICs 701 through 705 that perform various image processes, such as a resolution conversion, compression and extension, and multivalued-binary conversion, to image data. The ASICs 701 through 705 share the RAM 104, and output and input data through the image bus 112. The image processor 113 is able to execute a plurality of image processes in parallel using the ASICs 701 through 705. For example, the scan image process by the ASIC 701 is executed in parallel with the image process by the ASIC 702. Since data is transferred through the image bus 112 in each image process, the image bus 112 is crowded. Furthermore, when the scanner unit 114 reads a document at high speed in the scan image process, the data transfer amount per unit time in the image bus 112 becomes huge, and exceeds a transferable upper limit value of the image bus 112. When the data transfer amount through the image bus 112 exceeds the transferable upper limit value, the data transfer through the image bus 112 becomes impossible, and executions of the image processes stop. In light of this problem, the conventional method controlled the data transfer amount through the image bus 112 per unit time by lowering the reading speed of the scanner unit 114, for example. However, since such a method lowers the reading speed of the scanner unit 114 in order that the ASICs execute the image processes in parallel, the MFP 100 cannot exhibit performance equivalent to the high-speed reading set by a user. As a result, the waiting time of a user up to completion of reading by the scanner unit 114 increases.

In contrast, in the first embodiment, when the scan image process is executed independently, the frequency of the transfer enabling clock 402 is set to a predetermined frequency (a first setting step). Moreover, when the scan image process is executed in parallel with another image process, the frequency of the transfer enabling clock 402 is set to a frequency that is lower than the predetermined frequency (a second setting step).

Figure 8:
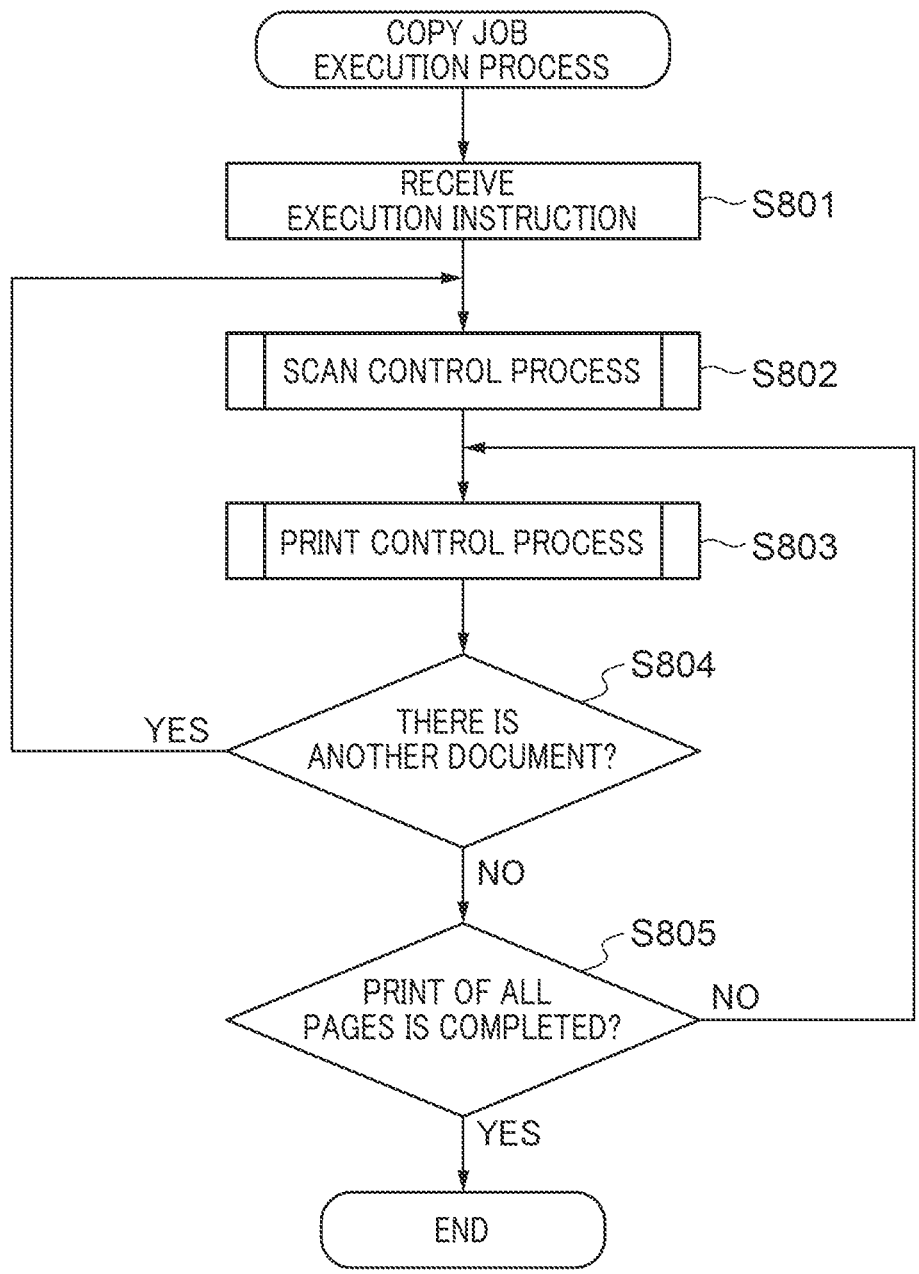
FIG. 8 is a flowchart showing procedures of a copy job execution process executed by the MFP in FIG. 1.

FIG. 8 is a flowchart showing procedures of a copy job execution process executed by the MFP 100 in FIG. 1. The process in FIG. 8 is performed when the CPU 102 runs the program stored in the ROM 103 etc.

As shown in FIG. 8, when receiving the execution instruction of a copy job through the operation unit 109 (step S801), the CPU 102 executes a scan control process in FIG. 9 mentioned later (step S802). Moreover, the CPU 102 executes a print control process (step S803) in FIG. 11 mentioned later in parallel with the process in the step S801. When the copy job received in the step S801 is a job that copies a document of a plurality of pages, the CPU 102 performs the processes in the steps S802 and S803 for every page. Next, the CPU 102 determines whether the document remains in the DF unit 200 (step S804).

As a result of the determination in the step S804, when the document remains in the DF unit 200, the CPU 102 returns the process to the step S802. As a result of the determination in the step S804, when the document does not remain in the DF unit 200, the CPU 102 determines whether the printing of all the pages was completed (step S805).

As a result of the determination in the step S805, when the printing of at least one page was not completed, the CPU 202 returns the process to the step S803. As a result of the determination in the step S805, when the printing of all the pages was completed, the CPU 102 finishes this process.

Figure 9:
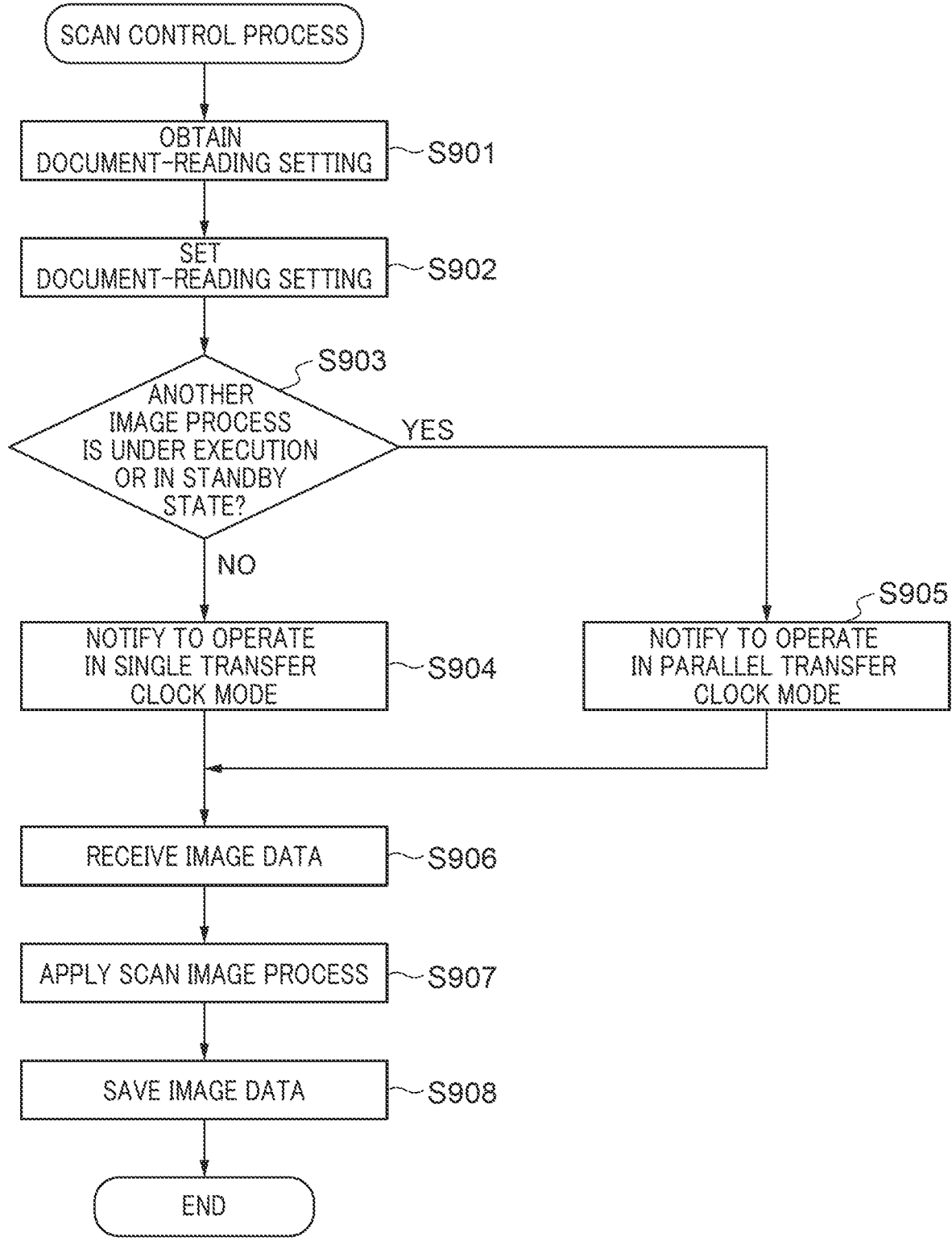
FIG. 9 is a flowchart showing procedures of a scan control process executed in step S802 in FIG. 8.

FIG. 9 is a flowchart showing procedures of the scan control process executed in the step S802 in FIG. 8.

As shown in FIG. 9, the CPU 102 obtains a document-reading setting (setting information) of the copy job set through the operation unit 109 (step S901). Next, the CPU 102 decides an ASIC for executing the scan image process corresponding to the obtained document-reading setting from among the ASICs 701 through 705 of the image processor 113, and sets the document-reading setting to the decided ASIC (step S902). Next, the CPU 102 determines whether another image process by an ASIC other than the decided ASIC is under execution or in a standby state (step S903). Another image process is a Rip process, a Send process, or a Fax process, for example. In the Send process, image data saved in the storage memory 105 is converted into data formats, such as JPEG and PDF. In the Fax process, image data is converted into an image format for performing Fax transmission.

As a result of the determination in the step S903, when any other image process is not under execution and the standby state, the CPU 102 notifies the scanner unit 114 to operate in a single transfer clock mode (step S904). In the single transfer clock mode, the CLK controller 303 sets the frequency of the transfer enabling clock 402 to the predetermined frequency, and the scanner unit 114 transfers image data to the controller 101 by the transfer enabling clock 402 concerned. Next, the CPU 102 performs a process in and after step S906 mentioned later.

Figure 10:
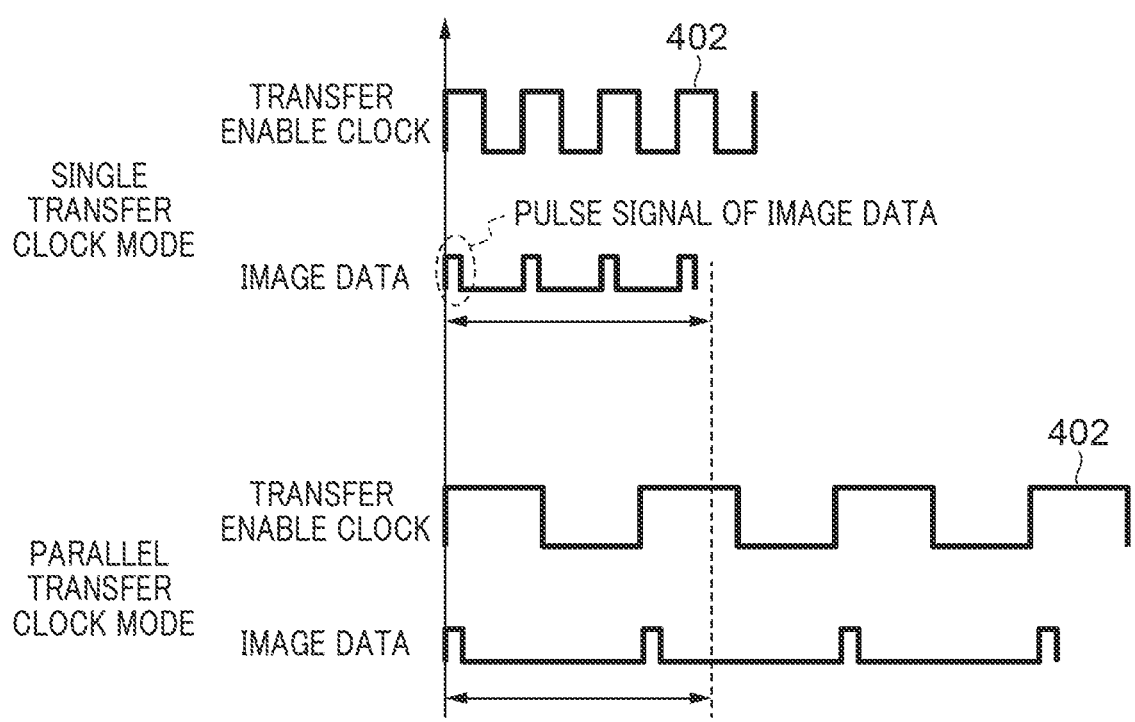
FIG. 10 is a view for describing transfer of the image data in a parallel transfer clock mode by the scanner unit in FIG. 1.

As a result of the determination in the step S903, when another image process is under execution or in the standby state, the CPU 102 notifies the scanner unit 114 to operate in a parallel transfer clock mode (step S905). In the parallel transfer clock mode, the CLK controller 303 sets the frequency of the transfer enabling clock 402 to a frequency lower than the predetermined frequency, and the scanner unit 114 transfers image data to the controller 101 by the transfer enabling clock 402 concerned. Thereby, the number of pulse signals of image data per unit time decreases in the scan image process as shown in FIG. 10, which reduces the data transfer amount through the image bus 112 per unit time. Next, the CPU 102 receives the image data from the scanner unit 114 (step S906) and applies the scan image process to the received image data using the ASIC to which the document-reading setting has been set (step S907). Next, the CPU 102 saves the image data to which the scan image process has been applied in the RAM 104 (step S908), and finishes this process.

Figure 11:
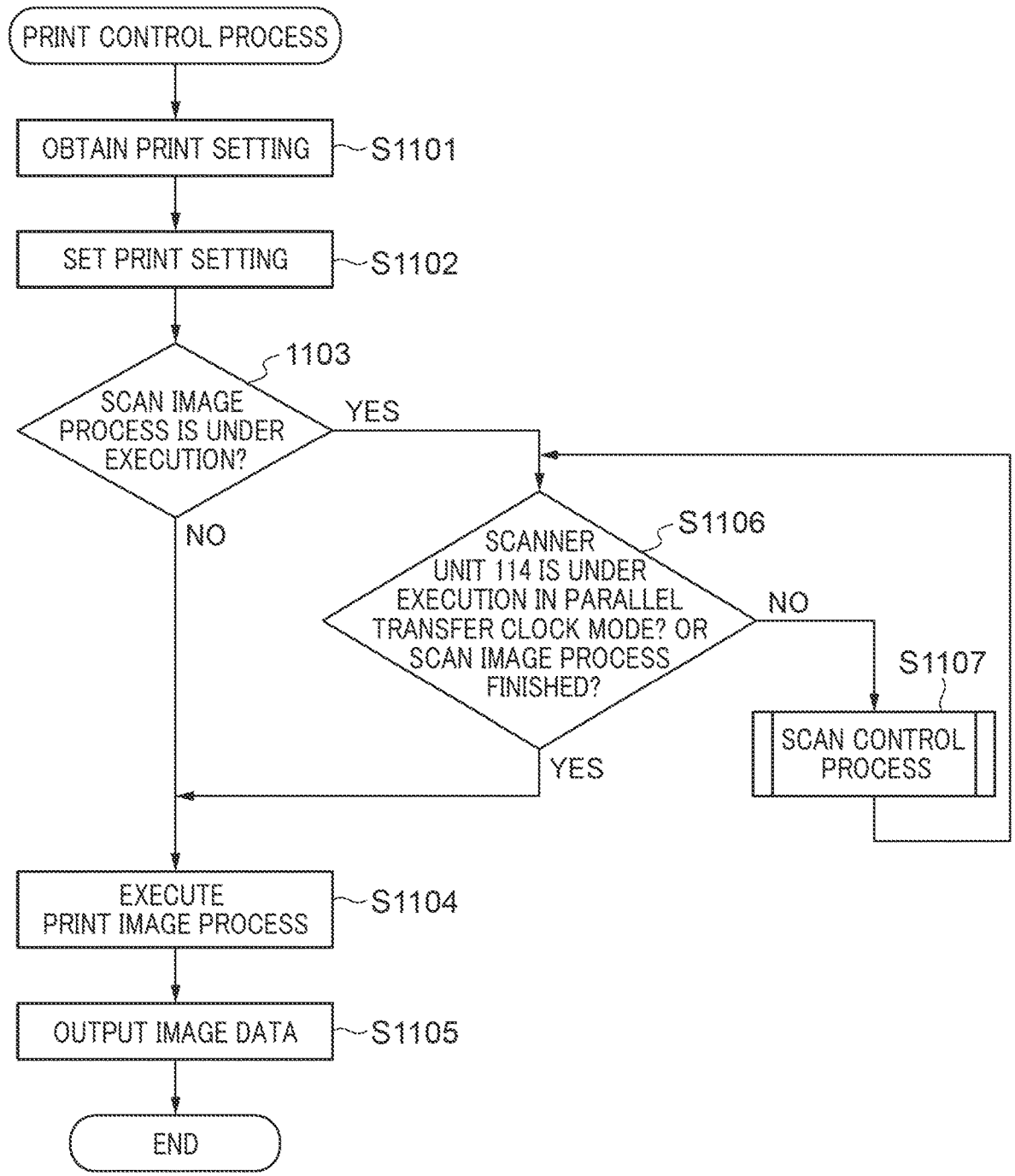
FIG. 11 is a flowchart showing procedures of a print control process in step S803 in FIG. 8.

FIG. 11 is a flowchart showing procedures of the print control process in the step S803 in FIG. 8.

As shown in FIG. 9, the CPU 102 obtains a print setting of the copy job set through the operation unit 109 (step S1101). Next, the CPU 102 decides an ASIC for executing the print image process corresponding to the obtained print setting from among the ASICs 701 through 705 of the image processor 113, and sets the print setting to the decided ASIC (step S1102). The print image process includes the Rip process mentioned above, for example. Next, the CPU 102 determines whether the scan image process is under execution (step S1103).

As a result of the determination in the step S1103, when the scan image process is not under execution, the CPU 102 applies the print image process to the image data saved in the RAM 104 using the ASIC to which the print setting has been set (step S1104). Next, the CPU 102 outputs the image data to which the print image process has been applied to the printer unit 115 (step S1105), and finishes this process.

As a result of the determination in the step S1103, when the scan image process is under execution, the CPU 102 determines whether the scanner unit 114 is operating in the parallel transfer clock mode or whether the scan image process finished (step S1106).

As a result of the determination in the step S1106, when the scanner unit 114 is not operating in the parallel transfer clock mode and the scan image process does not finish, the CPU 102 executes the scan control process in FIG. 9 (step S1107). After finishing the process in the step S1107, the CPU 102 returns the process to the step S1106.

As a result of the determination in the step S1106, when the scanner unit 114 is operating in the parallel transfer clock mode or when the scan image process finished, the CPU 102 executes the process in and after the step S1104.

According to the processes in FIG. 8, FIG. 9, and FIG. 11 mentioned above, when the scan image process is executed independently, the frequency of the transfer enabling clock 402 is set to the predetermined frequency. Moreover, when the scan image process is executed in parallel with another image process, the frequency of the transfer enabling clock 402 is set to a frequency that is lower than the predetermined frequency. Thereby, when the scan image process is executed in parallel with another image process, the data transfer amount through the image bus 112 per unit time in the scan image process can be controlled so as not to exceed the transferable upper limit value by the method other than the control of the reading speed of the scanner unit 114. As a result of this, the scan job and another image process are executed in parallel without lowering the reading speed of the scanner unit 114.

Moreover, in the processes in FIG. 8, FIG. 9, and FIG. 11 mentioned above, the image processor 113 transfers the data with the scanner unit 114, RAM 104, and printer 115 through the single image bus 112. Thereby, the scan job and another image process are executed in parallel without lowering the reading speed of the scanner unit 114.

Next, a multifunction apparatus according to a second embodiment of the present invention will be described. The second embodiment is basically identical to the above-mentioned first embodiment in the configuration and functions, but is different from the first embodiment in that the scanner unit 114 is provided with a high-speed transfer clock mode, normal transfer clock mode, and low-speed transfer clock mode. Accordingly, descriptions about the duplicate configuration and functions are omitted and a different configuration and functions will be described hereinafter.

The scanner unit 114 has a simultaneous double side reading function. The scanner unit 114 reads both of a front side 1201 and a back side 1202 of a document during one time of conveyance as shown in FIG. 12A. Moreover, the scanner unit 114 transfers image data 1203 and 1204 of two sheets, which are the front and back sides read, to the controller 101 within a document conveyance period for one sheet. In other words, the scanner unit 114 transfers the image data of one sheet to the controller 101 within a period of approximately half of the document conveyance period for one sheet. Moreover, when performing one side reading, the scanner unit 114 unifies the process with simultaneous double side reading and transfers image data of one sheet to the controller 101 in a period of approximately half of the document conveyance period for one sheet as shown in FIG. 12B.

In the second embodiment, any one of the high-speed transfer clock mode, normal transfer clock mode, and low-speed transfer clock mode is settable as a transfer mode of the scanner unit 114 at the time of performing the one side reading as shown in FIG. 13. In the high-speed transfer clock mode, the scanner unit 114 transfers image data by the transfer enabling clock 402 at a frequency that enables transfer of image data of one sheet within a period of approximately half of the document conveyance period for one sheet. In the normal transfer clock mode, the scanner unit 114 transfers image data by the transfer enabling clock 402 at a frequency that enables transfer of image data of one sheet within the document conveyance period for one sheet. In the low-speed transfer clock mode, the scanner unit 114 transfers image data by the transfer enabling clock 402 at a frequency that enables transfer of image data of one sheet within a predetermined period that is slightly longer than the document conveyance period for one sheet.

Figure 14:
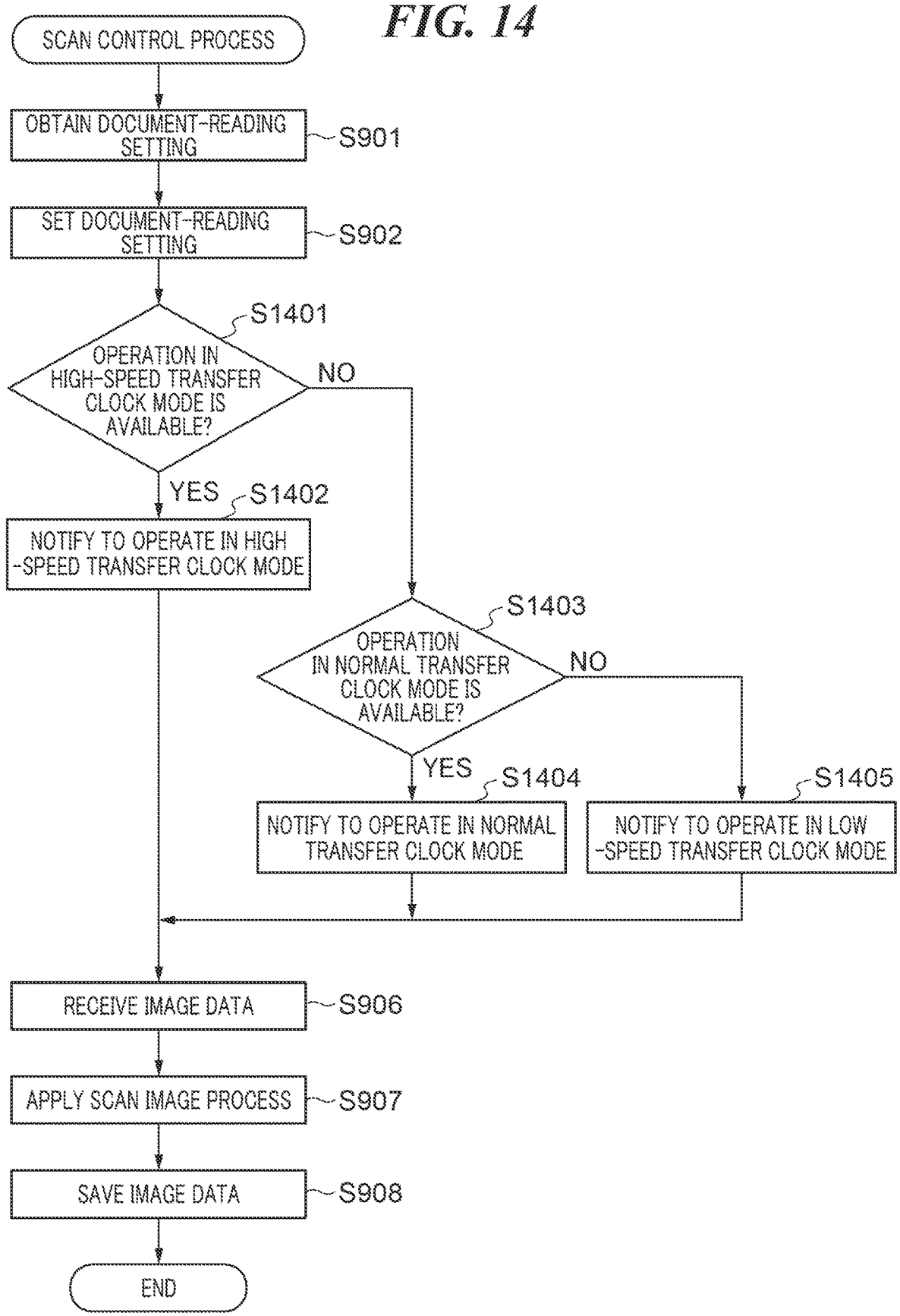
FIG. 14 is a flowchart showing procedures of a scan control process executed by an MFP according to a second embodiment of the present invention.

FIG. 14 is a flowchart showing procedures of the scan control process executed by the MFP 100 according to the second embodiment of the present invention. The process in FIG. 14 is premised that the received job includes the scan image process of the one side reading.

As shown in FIG. 14, the CPU 102 performs the process in the steps S901 and S902. Next, the CPU 102 determines whether the scanner unit 114 is operatable in the high-speed transfer clock mode (step S1401). For example, as shown in FIG. 15A, when the number of the image processes including the above-mentioned scan image process that are executed in parallel is two or less, the data transfer amount through the image bus 112 never exceeds the transferable upper limit value even if the scanner unit 114 operates in the high-speed transfer clock mode. In such a case, the CPU 102 determines that the scanner unit 114 is operatable in the high-speed transfer clock mode in the step S1401. In the meantime, when the number of the image processes including the above-mentioned scan image process that are executed in parallel is three or more, the data transfer amount through the image bus 112 may exceed the transferable upper limit value when the scanner unit 114 operates in the high-speed transfer clock mode. In such a case, the CPU 102 determines that the scanner unit 114 cannot operate in the high-speed transfer clock mode in the step S1401.

As a result of the determination in the step S1401, when the scanner unit 114 is operatable in the high-speed transfer clock mode, the CPU 102 sends a notice to the scanner unit 114 so as to operate in the high-speed transfer clock mode (step S1402). When receiving this notice, the CLK controller 303 of the scanner unit 114 sets the frequency of the transfer enabling clock 402 to the frequency corresponding to the high-speed transfer clock mode, and the scanner unit 114 transfers image data to the controller 101 by the transfer enabling clock 402 concerned. Next, the CPU 102 performs the process in and after the step S906.

As a result of the determination in the step S1401, when the scanner unit 114 cannot operate in the high-speed transfer clock mode, the CPU 102 determines whether the scanner unit 114 is operatable in the normal transfer clock mode (step S1403). For example, as shown in FIG. 15B, when the number of the image processes including the above-mentioned scan image process that are executed in parallel is three or less, the data transfer amount through the image bus 112 never exceeds the transferable upper limit value, even if the scanner unit 114 operates in the normal transfer clock mode. In such a case, the CPU 102 determines that the scanner unit 114 is operatable in the normal transfer clock mode in the step S1403. In the meantime, as shown in FIG. 15C, when the number of the image processes including the above-mentioned scan image process that are executed in parallel is four or more, the data transfer amount through the image bus 112 may exceed the transferable upper limit value, when the scanner unit 114 operates in the normal transfer clock mode. In such a case, the CPU 102 determines that the scanner unit 114 is not operatable in the normal transfer clock mode in the step S1403.

As a result of the determination in the step S1403, when the scanner unit 114 is operatable in the normal transfer clock mode, the CPU 102 sends a notice to the scanner unit 114 so as to operate in the normal transfer clock mode (step S1404). When receiving this notice, the CLK controller 303 of the scanner unit 114 sets the frequency of the transfer enabling clock 402 to the frequency corresponding to the normal transfer clock mode, and the scanner unit 114 transfers image data to the controller 101 by the transfer enabling clock 402 concerned. Next, the CPU 102 performs the process in and after the step S906.

As a result of the determination in the step S1403, when the scanner unit 114 is not operatable in the normal transfer clock mode, the CPU 102 sends a notice to the scanner unit 114 so as to operate in the low-speed transfer clock mode (step S1405). When receiving this notice, the CLK controller 303 of the scanner unit 114 sets the frequency of the transfer enabling clock 402 to the frequency corresponding to the low-speed transfer clock mode, and the scanner unit 114 transfers image data to the controller 101 by the transfer enabling clock 402 concerned. Next, the CPU 102 performs the process in and after the step S906.

Figure 16:
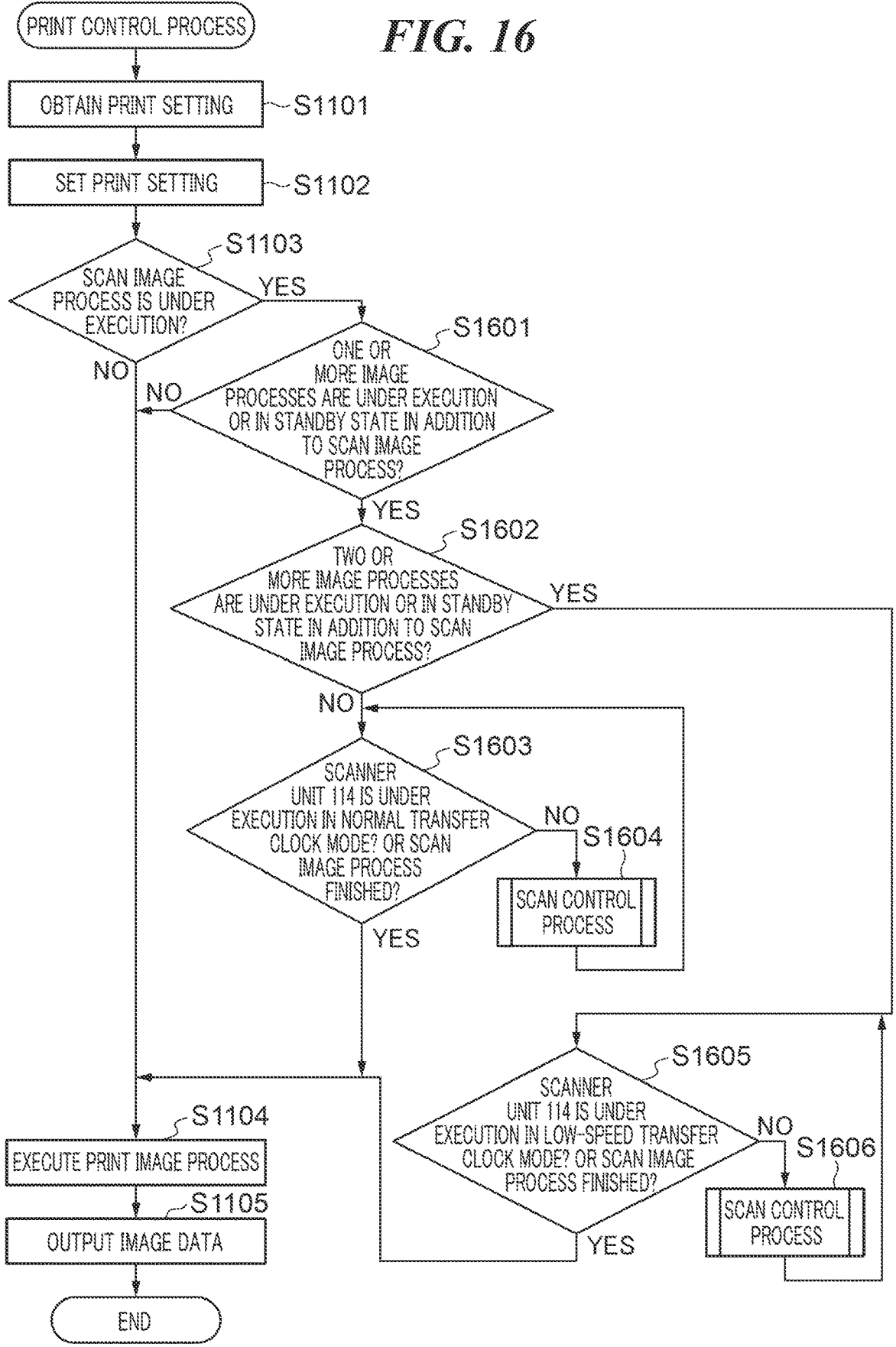
FIG. 16 is a flowchart showing a second print process executed by the image forming apparatus according to the second embodiment of the present invention.

FIG. 16 is a flowchart showing procedures of the print control process executed by the MFP 100 according to the second embodiment of the present invention.

As shown in FIG. 16, the CPU 102 performs the process in the steps S1101 through S1103. As a result of the determination in the step S1103, when the scan image process is not under execution, the CPU 102 performs the process in and after the step S1104.

As a result of the determination in the step S1103, when the scan image process is under execution, the CPU 102 determines whether the number of image processes under execution or in the standby state is one or more in addition to the scan image process (step S1601).

As a result of the determination in the step S1601, when the number of image processes under execution or in the standby state is not one or more in addition to the scan image process, the CPU 102 performs the process in and after the step S1104. As a result of the determination in the step S1601, when the number of image processes under execution or in the standby state is one or more in addition to the scan image process, the CPU 102 determines whether the number of image processes under execution or in the standby state is two or more in addition to the scan image process (step S1602).

As a result of the determination in the step S1602, when the number of image processes under execution or in the standby state is not two or more in addition to the scan image process, the CPU 102 performs the process in step S1603. In the step S1603, the CPU 102 determines whether the scanner unit 114 is operating in the normal transfer clock mode or whether the scan image process finished.

As a result of the determination in the step S1603, when the scanner unit 114 is operating in the normal transfer clock mode or when the scan image process finished, the CPU 102 executes the process in and after the step S1104. As a result of the determination in the step S1603, when the scanner unit 114 is not operating in the normal transfer clock mode and the scan image process does not finish, the CPU 102 executes the scan control process in FIG. 14 (step S1604). After finishing the process in the step S1604, the CPU 102 returns the process to the step S1603.

As a result of the determination in the step S1602, when the number of image processes under execution or in the standby state is two or more in addition to the scan image process, the CPU 102 performs the process in step S1605. In the step S1605, the CPU 102 determines whether the scanner unit 114 is operating in the low-speed transfer clock mode or whether the scan image process finished.

As a result of the determination in the step S1605, when the scanner unit 114 is operating in the low-speed transfer clock mode or when the scan image process finished, the CPU 102 executes the process in and after the step S1104. As a result of the determination in the step S1605, when the scanner unit 114 is not operating in the normal transfer clock mode and the scan image process does not finish, the CPU 102 executes the scan control process in FIG. 14 (step S1606). After finishing the process in the step S1606, the CPU 102 returns the process to the step S1605.

In the above-mentioned processes in FIG. 14 and FIG. 16, one of the high-speed transfer clock mode, normal transfer clock mode, and low-speed transfer clock mode of which transfer speeds differ is set in accordance with the number of other image processes executed in parallel with the scan image process. As a result of this, more other image processes are executed in parallel without lowering the reading speed of the scanner unit 114.

Figure 17A:
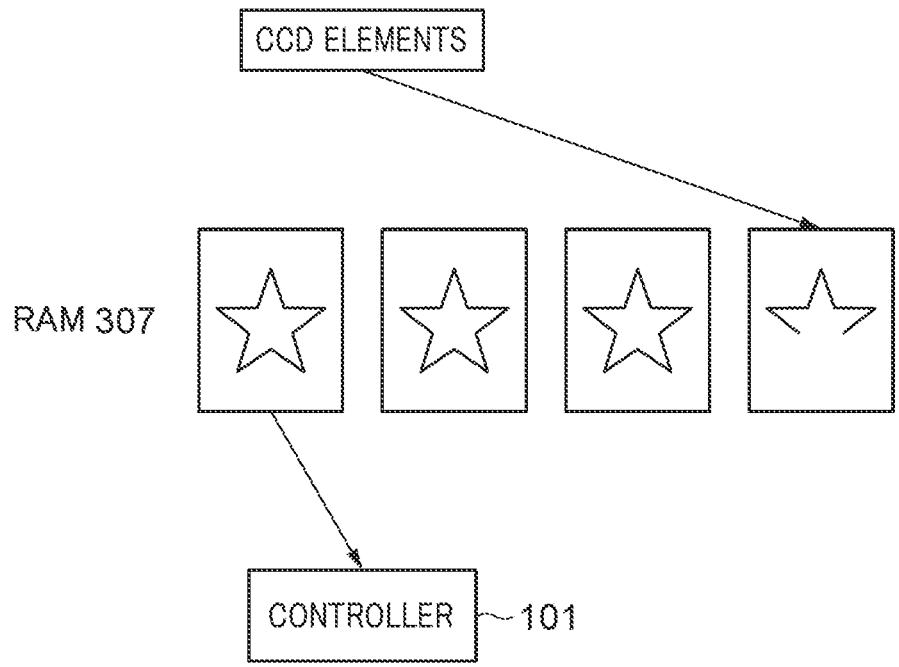
FIG. 17A and FIG. 17B are views for describing reading control of a document at the time of using up a RAM in FIG. 3.
Figure 17B:
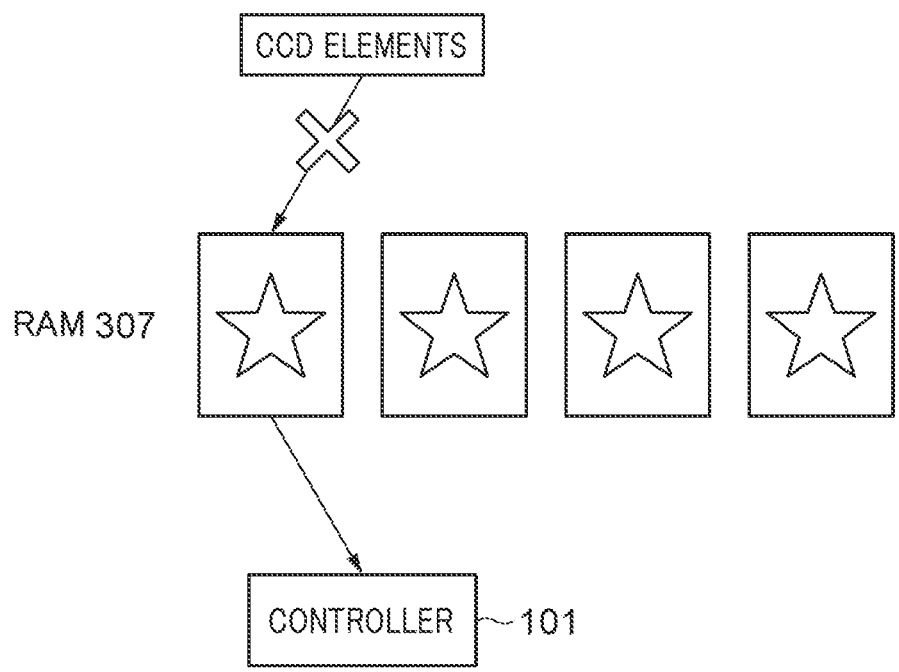

In the above-mentioned embodiment, since the transfer time for image data of one sheet is longer than the reading time for one sheet of a document in the low-speed transfer clock mode, if the reading of documents continues as-is, the memory area of the RAM 307 of the scanner unit 114 will be used up. When the memory area of the RAM 307 is used up, the reading of a document is preferably stopped until the scanner unit 114 finishes transfer of the image data of one sheet to the controller 101 so as to secure a free space in the RAM 307 as shown in FIG. 17A and FIG. 17B. Otherwise, the reading clock 401 may be temporarily lowered to a frequency lower than the transfer enabling clock 402 in the low-speed transfer clock mode according to a checking result of an operating condition of the RAM 307 while giving priority to prevention of using up of the memory area of the RAM 307.

Next, a multifunction apparatus according to a third embodiment of the present invention will be described. The third embodiment is basically identical to the above-mentioned first embodiment in the configuration and functions, but is different from the first embodiment in that the frequency of the transfer enabling clock 402 is set up on the basis of a type of a document reading operation mode set by a user. Accordingly, descriptions about the duplicate configuration and functions are omitted and a different configuration and functions will be described hereinafter.

The scanner unit 114 is provided with a plurality of document reading operation modes of which document reading speeds are different. The plurality of document reading operation modes include a silent document-reading mode that is a low-speed reading mode in which the reading speed is lower than that in the normal operation, for example. The silent document-reading mode has an effect on reductions in document-feeding sound and in motor-driving sound while conveying a document because a document is conveyed at a speed lower than that in the normal operation. Moreover, since the reading speed in the silent document-reading mode is lower than that in the normal operation, the scanner unit 114 transfers the read image data to the controller 101 by the transfer enabling clock 402 of the frequency lower than that in the normal operation. Accordingly, even when the scan image process is executed in the silent document reading mode in parallel with another image process, the data transfer amount through the image bus 112 does not exceed the transferable upper limit value. However, if the frequency of the transfer enabling clock is changed at a time of executing another image process in parallel, the effect expected for the document reading operation mode designated by the user cannot be achieved even if the scanner unit 114 is operating in the silent document reading mode.

In light of this problem, in the third embodiment, the frequency of the transfer enabling clock is not changed when the low-speed reading mode in which the reading speed is lower than that of the normal operation is set.

Figure 18:
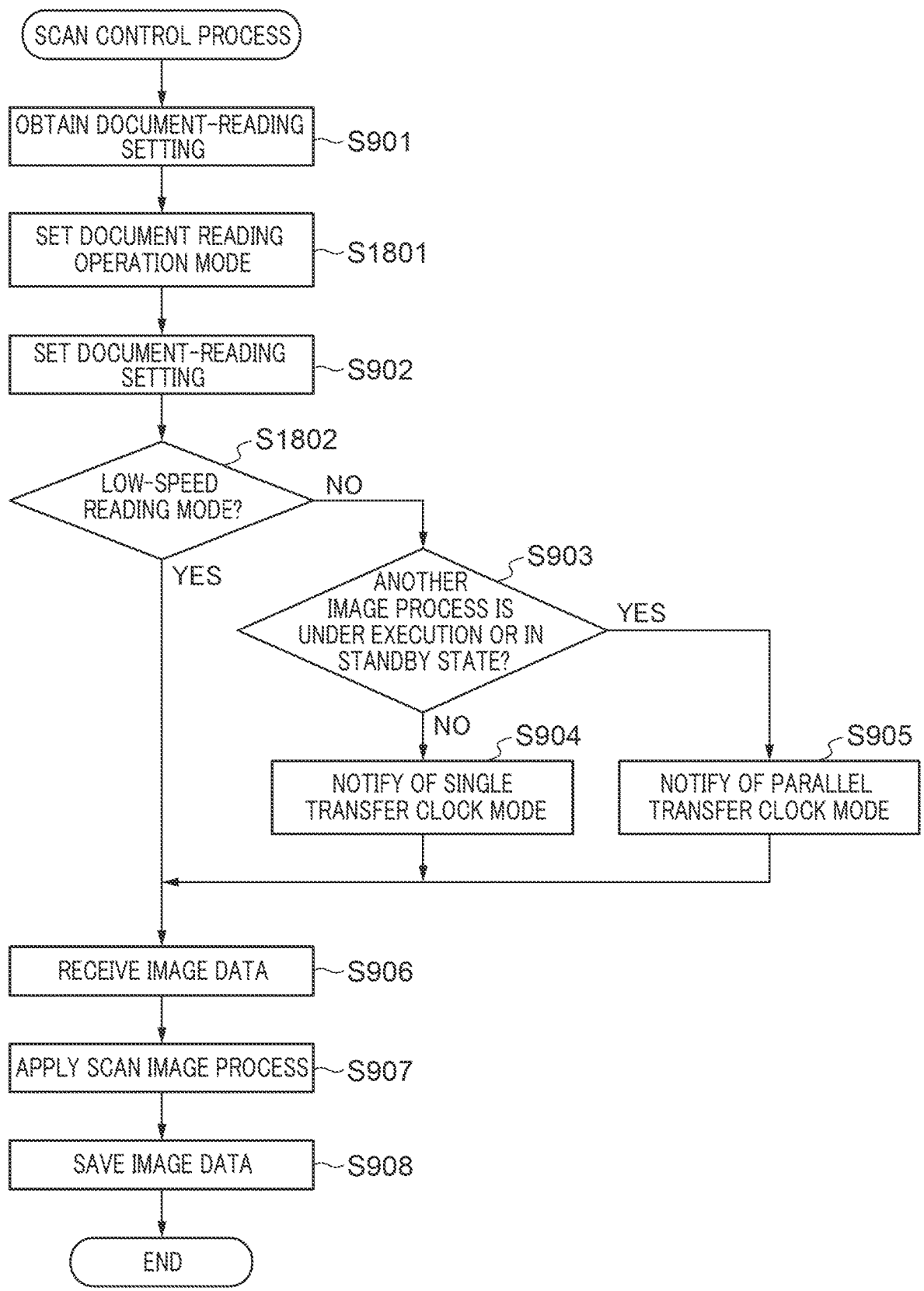
FIG. 18 is a flowchart showing a scan control process executed by an MFP according to a third embodiment of the present invention.

FIG. 18 is a flowchart showing procedures of the scan control process executed by the MFP 100 according to the third embodiment of the present invention.

As shown in FIG. 18, the CPU 102 performs the process in the steps S901. Information about the document reading operation mode of the scanner unit 114 is included in the document-reading setting. Next, the CPU 102 sets up the document reading operation mode on the basis of the obtained document-reading setting (step S1801) and sends a notice to the scanner unit 114 so as to operate in the set-up document reading operation mode. When receiving this notice, the CLK controller of the scanner unit 114 sets a frequency corresponding to the above-mentioned document reading operation mode as the frequency of the transfer enabling clock 402, for example. Next, the CPU 102 performs the process in the step S902. Next, the CPU 102 determines whether the set-up document reading operation mode is the low-speed reading mode (step S1802).

As a result of the determination in the step S1802, when the set-up document reading operation mode is the low-speed reading mode, the CPU 102 performs the process in and after the step S906 without sending the notice for changing the frequency of the transfer enabling clock 402. That is, in the third embodiment, when the scanner unit 114 is in the low-speed reading mode, the frequency of the transfer enabling clock 402 set up on the basis of the document-reading setting is maintained.

As a result of the determination in the step S1802, when the set-up document reading operation mode is not the low-speed reading mode, the CPU 102 performs the process in and after the step S903.

Figure 19:
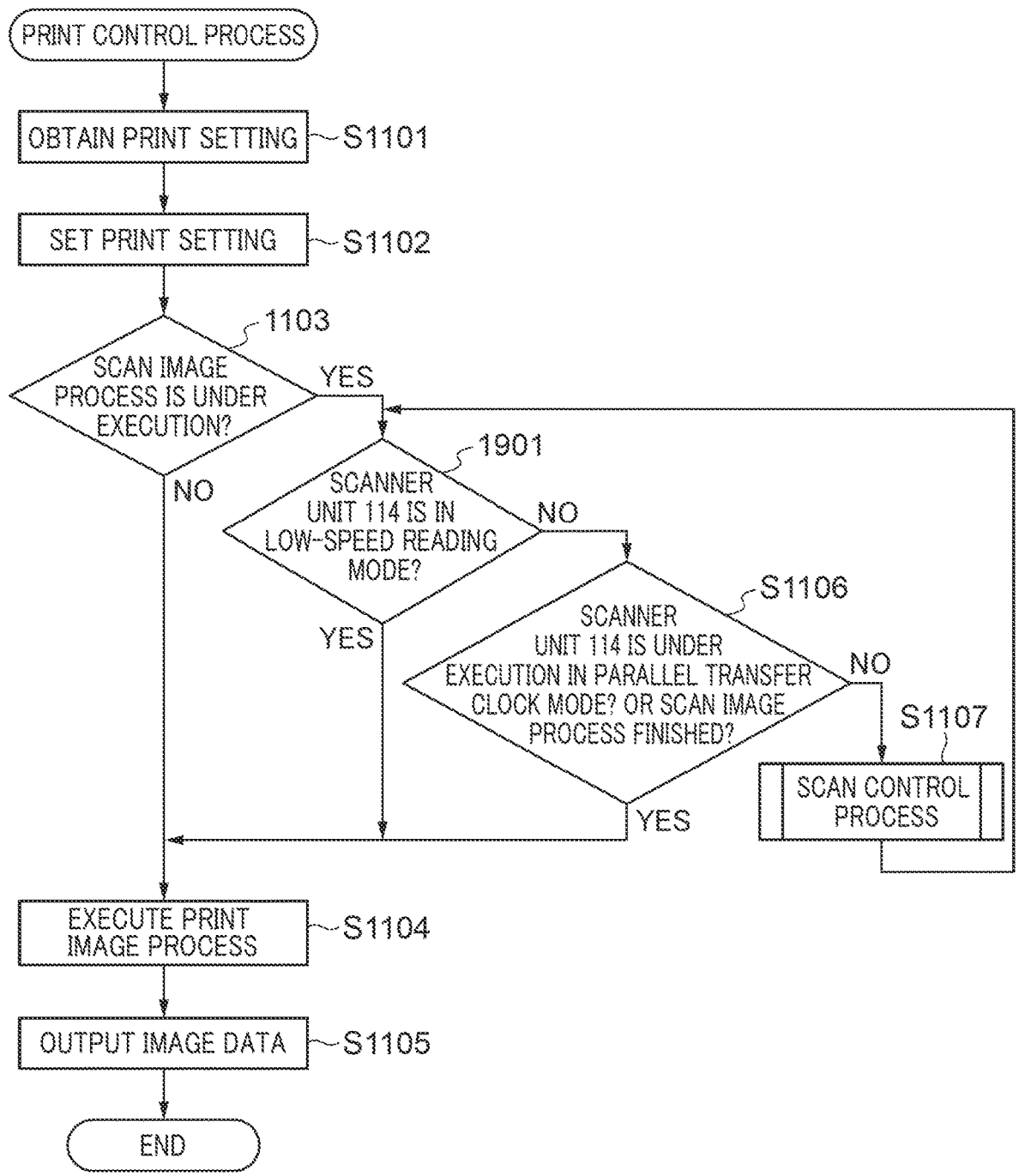
FIG. 19 is a flowchart showing a print control process executed by the MFP according to the third embodiment of the present invention.

FIG. 19 is a flowchart showing procedures of a print control process executed by the MFP 100 according to the third embodiment of the present invention.

As shown in FIG. 19, the CPU 102 performs the process in the steps S1101 through S1103. As a result of the determination in the step S1103, when the scan image process is not under execution, the CPU 102 performs the process in and after the step S1104.

As a result of the determination in the step S1103, when the scan image process is under execution, the CPU 102 determines whether the scanner unit 114 is in the low-speed reading mode (step S1901).

As a result of the determination in the step S1901, when the scanner unit 114 is in the low-speed reading mode, the CPU 102 performs the process in and after the step S1104. As a result of the determination in the step S1901, the scanner unit 114 is not in the low-speed reading mode, the CPU 102 performs the process in and after the step S1106.

In the above-mentioned processes in FIG. 18 and FIG. 19, when the scanner unit 114 is in the low-speed reading mode, the frequency of the transfer enabling clock 402 set up on the basis of the document-reading setting is maintained. This prevents the frequency of the transfer enabling clock 402 from being changed unnecessarily, and the effect expected for the document reading operation mode designated by the user is achieved.

Next, a multifunction apparatus according to a fourth embodiment of the present invention will be described. The fourth embodiment is basically identical to the above-mentioned first embodiment in the configuration and functions, but is different from the first embodiment in that a total value of band usages of the image bus 112 is calculated. Accordingly, descriptions about the duplicate configuration and functions are omitted and a different configuration and functions will be described hereinafter.

In the first embodiment mentioned above, even when there is no need of reducing the data transfer amount through the image bus 112, the transfer enabling clock 402 may be set to a frequency lower than the predetermined frequency. For example, when the scan image process is monochrome scan of a low resolution, the data amount transferred to the image bus 112 is comparatively little. In such a case, even if another image process is executed in parallel, the data transfer amount through the image bus 112 does not exceed the transferable upper limit value. Accordingly, it is preferable to set the transfer enabling clock 402 to the predetermined frequency so that the scanner unit 114 will transfer image data to the controller 101 promptly.

Corresponding to this, in the fourth embodiment, when the scan image process is executed in parallel with another image process, the total value of band usages of the image bus 112 is calculated, and the frequency of the transfer enabling clock 402 is set up on the basis of the calculation result.

Figure 20:
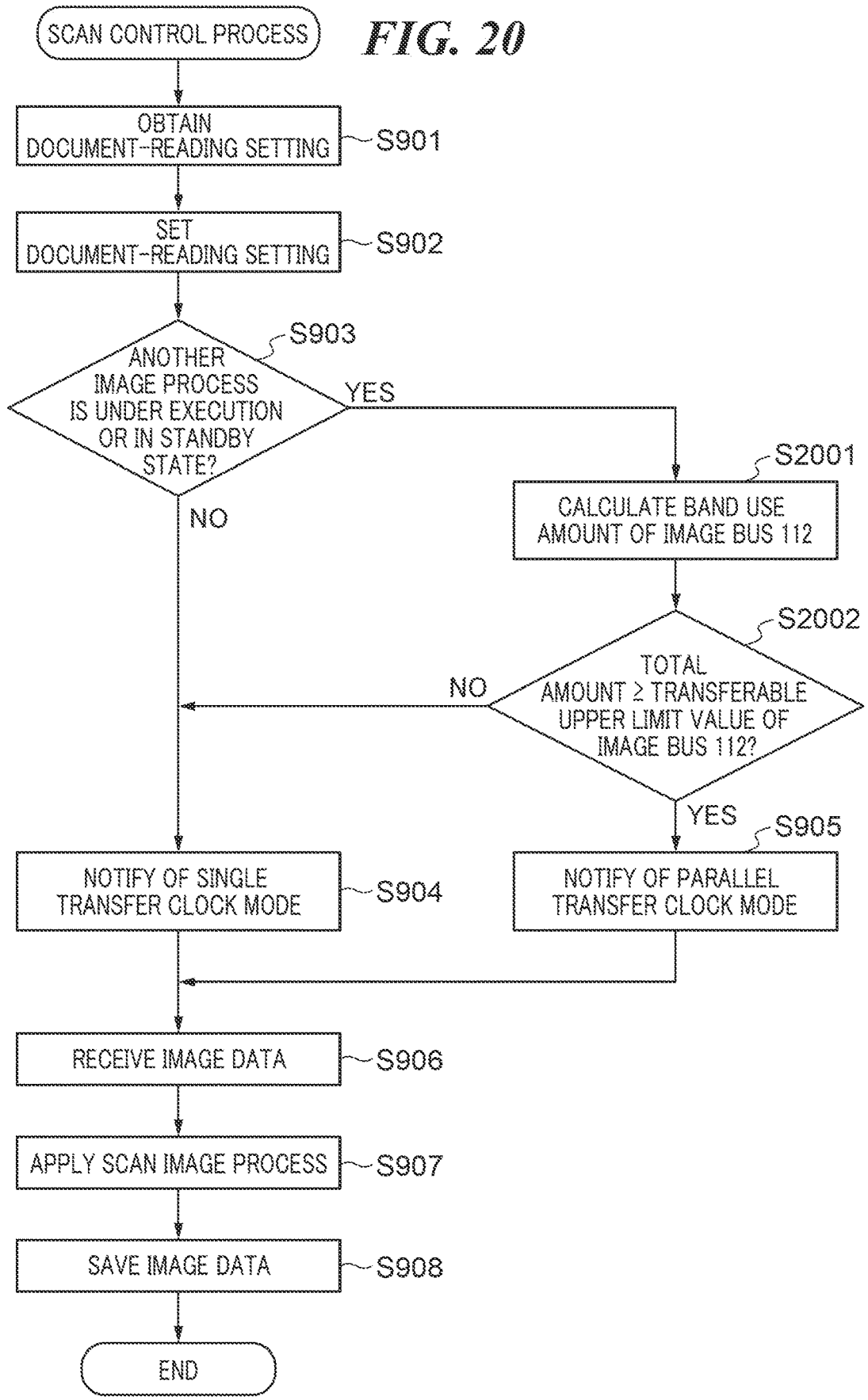
FIG. 20 is a flowchart showing a scan control process executed by an MFP according to a fourth embodiment of the present invention.

FIG. 20 is a flowchart showing procedures of the scan control process executed by the MFP 100 according to the fourth embodiment of the present invention.

As shown in FIG. 20, the CPU 102 performs the process in the steps S901 through S903. As a result of the determination in the step S903, when no other image process is under execution and in the standby state, the CPU 102 performs the process in the steps S904, S905 through S908.

As a result of the determination in the step S903, when another image process is under execution or in the standby state, the CPU 102 obtains the operation settings of the scan image process corresponding to the obtained document-reading setting, the image process under execution, and the image process in the standby state. Each of the operation settings includes color information about an image, such as CMYK, RGB, gray, and the monochrome binary, and resolution information about an image at least. Next, the CPU 102 calculates the band usages of the image bus 112 on the basis of the obtained operation settings (step S2001).

In the step S2001, the CPU 102 calculates the band usage in the above-mentioned scan image process using the obtained operation setting, first band usage information 2101 in FIG. 21A, and correction information 2102 in FIG. 21B. Moreover, the CPU 102 calculates the band usages in the image processes under execution or in the standby state other than the above-mentioned scan image process using the obtained operation setting and second band usage information 2103 in FIG. 21C. The first band usage information 2101, correction information 2102, and second band usage information 2103 are beforehand stored in the ROM 103 etc.

The first band usage information 2101 includes information that shows the band usage of the image bus 112 accompanying execution of the scan image process. Although FIG. 21A shows an example assuming that a data amount of an image is proportional to a band usage in order to simplify the description, a data amount of an image is not necessarily simply proportional to a band usage. Accordingly, it is preferable to generate the first band usage information 2101 on the basis of the values found experimentally.

The correction information 2102 includes a correction value to the document reading operation mode of the scanner unit 114. The correction information 2102 is generated on the basis of the reading speed of the scanner unit 114 or a value found experimentally. In the MFP 100, the data amount of the image that should be processed per unit time depends on the document reading operation mode of the scanner unit 114. Accordingly, the CPU 102 corrects the band usage of the scan image process by multiplying the correction value corresponding to the set-up document reading operation mode in the correction information 2102 to the value obtained from the first band usage information 2101 on the basis of the operation setting.

The second band usage information 2103 includes information that shows a band usage of the image bus 112 accompanying execution of an image process other than the scan image process. It should be noted that different parameters of the resolution information and the color information may be set in the second band usage information 2103 as with the first band usage information 2101.

The CPU 102 calculates the total value of the band usages in the above-mentioned scan image process and in the image process under execution or in the standby state other than the above-mentioned scan image process. Next, the CPU 102 determines whether the calculated total value is equal to or more than the transferable upper limit value of the image bus 112 beforehand stored in the ROM 102 etc. (step S2002). For example, when the transferable upper limit value is "17" and the scan image process is an RGB scan of 600*600 dpi., the MFP 100 is capable of executing a Send process or a Fax process in parallel with this scan image process in the single transfer clock mode as shown in FIG. 21D. In the meantime, when the transferable upper limit value is "17" and the above-mentioned scan image process is a gray scan of 600*600 dpi., the MFP 100 is capable of executing three image processes including the above-mentioned scan image process in parallel in the single transfer clock mode as shown in FIG. 21E.

As a result of the determination in the step S2002, when the calculated total value of the band usages is less than the transferable upper limit value, the CPU 102 performs the process in and after the step S904. As a result of the determination in the step S2002, when the calculated total value of the band usages is equal to or more than the transferable upper limit value, the CPU 102 performs the process in and after the step S905.

In the above-mentioned process in FIG. 20, when the total value of the band usages of the image bus 112 is equal to or more than the transferable upper limit value, the transfer enabling clock 402 is set to the frequency lower than the predetermined frequency. That is, the frequency of the transfer enabling clock 402 is set to the frequency lower than predetermined frequency only in the case of minimum necessity, such as a case where the data transfer through the image bus 112 falls into an impossible state. Accordingly, the scan image process is executable in parallel with another image process while minimizing the influence on the scan image process due to the control of the frequency of the transfer enabling clock 402.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-131632, filed Jul. 11, 2018, which is hereby incorporated by reference herein in its entirety.

What is claimed is:

1. An image processing apparatus including a scanner controller and a controller, the image processing apparatus comprising:
    a scanner configured to scan a document and generate image data of the document, the scanner controller including a memory that stores the image data generated by the scanner and being configured to transfer the stored image data to the controller,
    wherein the controller includes:
    a data bus;
    an image processor configured to perform a predetermined image process on the image data transferred via the data bus from the scanner controller; and
    a clock controller configured to control a frequency of an image transfer clock for transferring the image data of the document from the scanner controller to the controller,
    wherein the clock controller controls the frequency of the image transfer clock based on whether another predetermined image process is being performed when a job for scanning the document by the scanner is started.

2. An image processing apparatus including a scanner controller and a controller, the image processing apparatus comprising:
    a scanner configured to scan a document and generate image data of the document, the scanner controller including a memory that stores the image data generated by the scanner and being configured to transfer the stored image data to the controller;
    wherein the controller includes:

a data bus;

an image processor configured to perform a predetermined image process on the image data transferred via the data bus from the scanner controller; and a clock controller configured to set a frequency of an image transfer clock for transferring the image data of the document from the scanner controller to the controller, wherein the clock controller sets the frequency of the image transfer clock to a first frequency in a case where another predetermined image process is not being performed at least when a job for scanning the document by the scanner is started, and wherein the clock controller sets the frequency of the image transfer clock to a second frequency lower than the first frequency in a case where the another predetermined image process is being performed at least when the job for scanning the document by the scanner is started.

3. The image processing apparatus according to claim 1, wherein the clock controller sets the frequency of the image transfer clock to the first frequency and the scanner scans the document at a first scanning speed in the case where the another predetermined image process is not being performed at least when the job for scanning the document by the scanner is started, and wherein the clock controller sets the frequency of the image transfer clock to the second frequency lower than the first frequency and the scanner scans the document at the first scanning speed in the case where the another predetermined image process is being performed at least when the job for scanning the document by the scanner is started.

4. The image processing apparatus according to claim 1, wherein the job is a copy job for scanning the document by the scanner and printing an image of the scanned document.

5. The image processing apparatus according to claim 1, further comprising:

another memory configured to store the image data temporarily; and a printer configured to print the image data, wherein the image processor transfers data with the another memory and the printer through a single image bus.

6. The image processing apparatus according to claim 5, wherein:

the clock controller is configured to calculate a total value of band usages of the single image bus when the predetermined image process and the another predetermined image process are performed in parallel, the controller is configured to determine whether the total value of the band usages of the image bus is equal to or more than an upper limit value of a data amount that is transferable through the image bus, and the clock controller sets the frequency of the image transfer clock to the second frequency in a case where the total value of the band usages of the image bus is equal to or more than the upper limit value.

7. The image processing apparatus according to claim 1, wherein, in the case where the another predetermined image process is being performed at least when the job for scanning the document by the scanner is started, the scanner controller transfers the image data to the controller by the second frequency lower than the first frequency.

8. The image processing apparatus according to claim 1, wherein image data on which the another predetermined image process is performed is transferred via the data bus.

9. A control method for an image processing apparatus that includes a scanner controller, a controller, and a scanner configured to scan a document and generate image data of the document, the scanner controller including a memory that stores the image data generated by the scanner and being configured to transfer the stored image data to the controller, the controller including a data bus, the control method comprising:

performing a predetermined image process on the image data transferred via the data bus from the scanner controller; and setting a frequency of an image transfer clock for transferring the image data of the document from the scanner controller to the controller such that (i) the frequency of the image transfer clock is set to a first frequency in a case where another predetermined image process is not being performed at least when a job for scanning the document by the scanner is started and (ii) the frequency of the image transfer clock is set to a second frequency lower than the first frequency in a case where the another predetermined image process is being performed at least when the job for scanning the document by the scanner scans is started.

10. A non-transitory computer-readable storage medium storing a control program causing a computer to execute a control method for an image processing apparatus that includes a scanner controller, a controller, and a scanner configured to scan a document and generate image data of the document, the scanner controller including a memory that stores the image data generated by the scanner and being configured to transfer the stored image data to the controller, the controller including a data bus, the control method comprising:

performing a predetermined image process on the image data transferred via the data bus from the scanner controller; and setting a frequency of an image transfer clock for transferring the image data of the document from the scanner controller to the controller such that (i) the frequency of the image transfer clock is set to a first frequency in a case where another predetermined image process is not being performed at least when a job for scanning the document by the scanner is started and (ii) the frequency of the image transfer clock is set to a second frequency lower than the first frequency in a case where the another predetermined image process is being performed at least when the job for scanning the document by the scanner scans is started.

\* \* \* \* \*